United States Patent
Weaver et al.

(10) Patent No.: US 6,827,119 B2
(45) Date of Patent: Dec. 7, 2004

(54) RADIALLY EXPANSIBLE TIRE ASSEMBLY DRUM AND METHOD FOR FORMING TIRES

(75) Inventors: Douglas Raymond Weaver, Uniontown, OH (US); William Dudley Currie, Stow, OH (US); Dennis Alan Lundell, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 10/095,176

(22) Filed: Mar. 11, 2002

(65) Prior Publication Data

US 2003/0168144 A1 Sep. 11, 2003

(51) Int. Cl.[7] ............................................. B29D 30/24
(52) U.S. Cl. ........................ 156/415; 156/416; 156/417
(58) Field of Search ............................ 156/398, 414–420

(56) References Cited

U.S. PATENT DOCUMENTS

| | | | | |
|---|---|---|---|---|
| 2,416,523 A | * | 2/1947 | Haren et al. | ................ 156/418 |
| 3,740,293 A | * | 6/1973 | Jones et al. | ................ 156/415 |
| 3,867,231 A | * | 2/1975 | Casey | ................ 156/415 |
| 3,873,398 A | * | 3/1975 | Yokoo et al. | ................ 156/417 |
| 3,888,720 A | * | 6/1975 | Habert | ................ 156/414 |
| 4,498,948 A | * | 2/1985 | Brown et al. | ................ 156/401 |
| 4,923,554 A | * | 5/1990 | Ozawa | ................ 156/417 |
| 5,591,288 A | | 1/1997 | Becker et al. | ........... 156/130.7 |
| 6,234,227 B1 | | 5/2001 | Bosseaux | ................ 156/398 |
| 6,250,356 B1 | | 6/2001 | Cordaillat et al. | .......... 156/400 |
| 6,343,638 B1 | | 2/2002 | Weaver et al. | ............. 156/415 |

FOREIGN PATENT DOCUMENTS

| | | |
|---|---|---|
| EP | 0 974 448 A1 | 1/2000 |
| EP | 1 136 243 A2 | 9/2001 |

* cited by examiner

*Primary Examiner*—Geoffrey L. Knable
(74) *Attorney, Agent, or Firm*—June E. Rickey; David L. King

(57) ABSTRACT

This invention relates to an improved radially expansible tire assembly drum (10) and a method forming tires (2) from an assemblage of tire components utilizing the assembly drum (10).

8 Claims, 24 Drawing Sheets

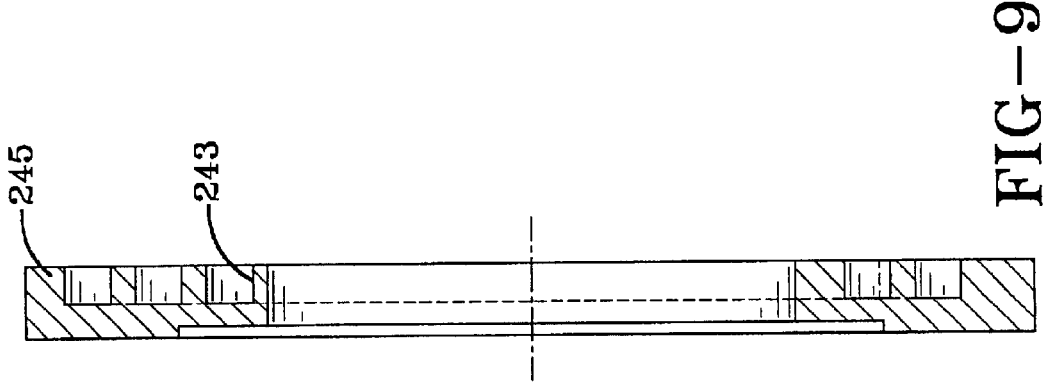
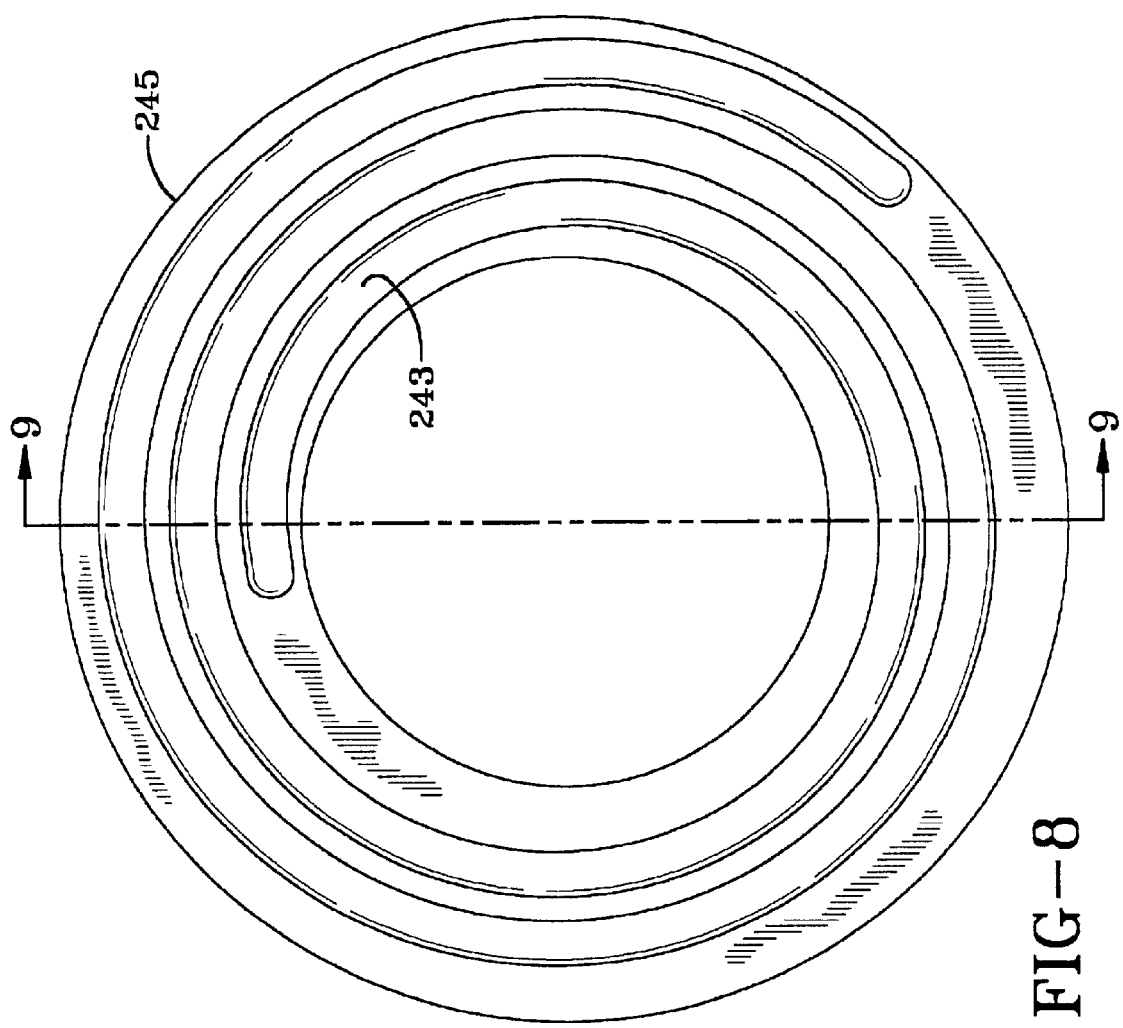

RADIALLY EXPANSIBLE TIRE ASSEMBLY DRUM AND METHOD FOR FORMING TIRES

FIELD OF THE INVENTION

This invention relates to an improved radially expansible tire assembly drum (10) and a method for forming tires (2) from an assemblage of tire components utilizing the assembly drum (10).

BACKGROUND OF THE INVENTION

Historically, the pneumatic tire has been fabricated as laminated structure of generally toroidal shape having beads, a tread, a belt reinforcement and carcass. The tire is made of rubber, fabric, and steel. The manufacturing technologies employed for the most part involve assembling the many tire components from flat strips or sheets of material. Each component is placed on a building drum and cut to length such that the ends of a component meet, or overlap, creating a splice.

In the first stage of assembly, the carcass would include one or more plies, and a pair of sidewalls, a pair of apexes, an inner liner (for a tubeless tire), a pair of chafers and perhaps a pair of gum shoulder strips. Annular bead cores can be added during the first stage of tire building, and the ply or plies can be turned around the bead cores to form the "ply turnups."

Typically, the carcass components (excluding the bead cores) would be either "butt spliced" or "lap spliced." A butt splice has the component ends joined, but not overlapped. A lap splice has overlapping ends.

This intermediate article of manufacture can be cylindrically formed at this point in the first stage of assembly. The cylindrical carcass is expanded into a toroidal shape after completion of the first-stage of tire building. Reinforcing belts and the tread are added to the intermediate article during a second stage of tire manufacture, which can occur using the same building drum or work station or at a separate shaping station.

During the expansion of the carcass, tensile stresses are imposed on the spliced and uncured components of the tire carcass.

In the case of automobile or light truck tires, lap splices were preferred because the splice remained intact, whereas butt splices would tend to open or fail. Even with the good adhesion of the lap splice, the cords adjacent the splice tended to be stretched compensating for the overlapped two layers of cords at the splice. This localized stretching creates a non-uniformity that is readily visible under x-ray, ultrasonic display or by physically cutting the tire and visually inspecting it.

The tire designer, in order to prevent the creation of tire uniformity problems, has historically insured that the splices of various layers of components were not circumferentially aligned. This non-alignment of splice joints was believed to improve the carcass overall durability and uniformity, as measured by the amount of force variation and the balance of the tire. Tire engineers also have believed that tire uniformity could be improved if these discontinuities were deliberately circumferentially spaced around the carcass. This meant that each component had to be applied to the ply at the tire building station where each component was cut and spliced in a spaced order.

When the cord reinforced plies are placed on the building drum, it is very important that the geometric spacing of the beads and the ply turnups are controlled a uniformly. Variations in the overall tire building process can result in variations in cord tension. These non-uniformities can affect the ride and handling characteristics of the tire.

In U.S. Pat. No. 6,250,356 to Michelin, a tire assembly drum is disclosed wherein the beads are two distinct sizes. Conventionally, tires are symmetrical having equal bead diameters. The two distinct diameters on a tire exacerbate the problems of tire building and the disclosed assembly drum provides a method and apparatus to permit the tire to be built in a more uniform and faster way. This building drum was designed to build tires having a given set of two different diameters at the first stage of assembly. A separate tire-shaping drum was used to toroidally shape the tire carcass to assemble the tread and belt reinforcements and that drum is disclosed in U.S. Pat. No. 6,234,227.

The present invention has the objective of providing a building drum that is radially expansible and capable of building tires of equal bead diameters or of different bead diameters over a range of diameter sizes. In one embodiment, the building drum further has the objective of having axially movable ends, which can be air tightly sealed to permit the assembled carcass to be inflated and shaped toroidally, avoiding removal from the assembly drum for a second stage of tire building.

SUMMARY OF THE INVENTION

An improved radially expansible assembly drum for the manufacture of tires is disclosed. The assembly drum has a body mounted on a drum core assembly and presenting a receiving surface for tire components to be assembled. The ends and the receiving surface have the same or different diameters. A means for covering the ends of the receiving surface and a means for radially expanding the drum are also provided. The means for radially expanding the drum includes the ability to radially expand the receiving surface at the center and the ends of the assembly drum.

The radially expansible assembly drum has the means for radially expanding the assembly drum, including a cam disk having an increasing spiral cam follower groove. The cam follower groove provides a continuous range of selectable diameters and stable expansion of the drum diameters as a function of cam disk rotation. The spiral cam follower groove radially increases or decreases, dependent on the direction of rotation, causing an increase or a decrease in diametrical expansion or contraction at a rate of 40 mm per 360° of rotation of the assembly drum. The continuous range of selectable diameters increases from a diameter of $d_i$ to a fully expanded diameter $d_e$, $d_e$ being equal to or greater than $d_i$+55 mm.

In one embodiment of the invention, the radially expandable assembly drum has a means for axially moving the ends of the assembly drum, the ends being simultaneously movable from an axially widely spaced location to an axially inner location closer to a centerline of the assembly drum. This movement of the two ends is preferably equal in axial displacement. This reduction in axial space between the two ends permits the cords of the ply to be radially expanded and the assembled tire carcass to be toroidally shaped to permit the tread and reinforcing belt structure to be assembled while the assembled tire is held on the radially expansible assembly drum.

The multi-movement capability of the assembly drum is achieved by this unique drum core assembly. The drum core assembly includes a spindle for rotating the assembly drum, a driving shaft which passes through the center of the spindle, and a first external shaft connected to the means for radially expanding the assembly drum. The first external shaft is parallel and eccentrically located relative to the centerline of the spindle. The driving shaft provides rotary motion to the first external shaft, via a first external clutch mechanism. The engagement of the first clutch mechanism rotates the first external shaft to initiate radial expansion or contraction of the drum assembly.

The drum core assembly further includes a second external shaft connected to the means for axially moving the ends of the assembly drum. The second external shaft is parallel to and eccentrically located relative to the centerline of the spindle. The second external shaft is connected to a second clutch mechanism. The engagement of the second clutch mechanism (to the driving shaft) rotates the second external shaft to initiate axial movement of the ends of the assembly drum.

The second external shaft has oppositely directed threads, one set of threads being connected to one end of the assembly drum, the oppositely directed threads being connected to the opposite end of the assembly drum. Rotation of the second external shaft in one rotating direction moves the ends of the assembly drum closer while an opposite rotation of the second external shaft moves the ends further apart.

Due to the fact the entire drum can be rotated by the spindle independent of the action of the first or second external shafts, means that the exact location of the drum assembly in terms of axial width, radial expansion, and angular rotation is not fixed absent a means for establishing these locations. The radially expansible assembly drum provides a three-way encoder means to provide exact locations of each position of assembly drum.

The encoder means includes three sensors for indicating the angular rotation of the drum core assembly. The three sensors indicate the angular rotation of the spindle, the first external shaft and the second external shaft, respectively. Each encoder has a sensor that is located in proximity to an annular disk, which is fixed to one of the shafts. The annular disk has a readable surface, which enables the sensor to detect the exact location of the respective shaft. The rotation of the shafts are sensed and fed back to a means for computing the angular position of each of the shafts relative to a pre-selected building sequence to initiate the movements of the drum assembly.

The preferred embodiment of the invention includes a means for inflating the assembled tire carcass while on the assembly drum for a second stage assembly of a tread and a belt reinforcing structure. In one embodiment, there is a means for moving one or both ends of the assembly drum relative to the other end. Additionally, the means for covering the ends of the receiving surface is preferably a flexible elastomeric membrane. The means for covering, the ends of the receiving surfaces form an airtight seal on each end of the assembly drum. This feature facilitates the inflating of the assembled tire component by creating airtight seals around the ends of the assembly drum Furthermore, the beads of the tire, by compressing the elastomeric means for covering the ends into depressions in the ends, insures the seals are maintained between the internal surfaces of the tire and the assembly drum.

Definitions

"Apex" means an elastomeric filler located radially above the bead and interposed between the plies and the ply turn-up.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Shoulder" means the upper portion of sidewall just below the tread edge.

"Sidewall" means that portion of a tire between the tread and the bead.

"Subassembly" means an unvulcanized assembly of laminated tire components to which a cord reinforced ply or plies and other components can be added to form a tire carcass.

"Tread" means a rubber component which, when bonded to a tire carcass, includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which:

FIG. 8 is a plan view of a cam follower disk displaying a spiral groove, the view being taken along lines 8—8 of FIG. 7;

FIG. 9 is a cross-sectional view of the cam follower disk as shown in FIG. 8;

DETAILED DESCRIPTION OF THE INVENTION

Figure 1:
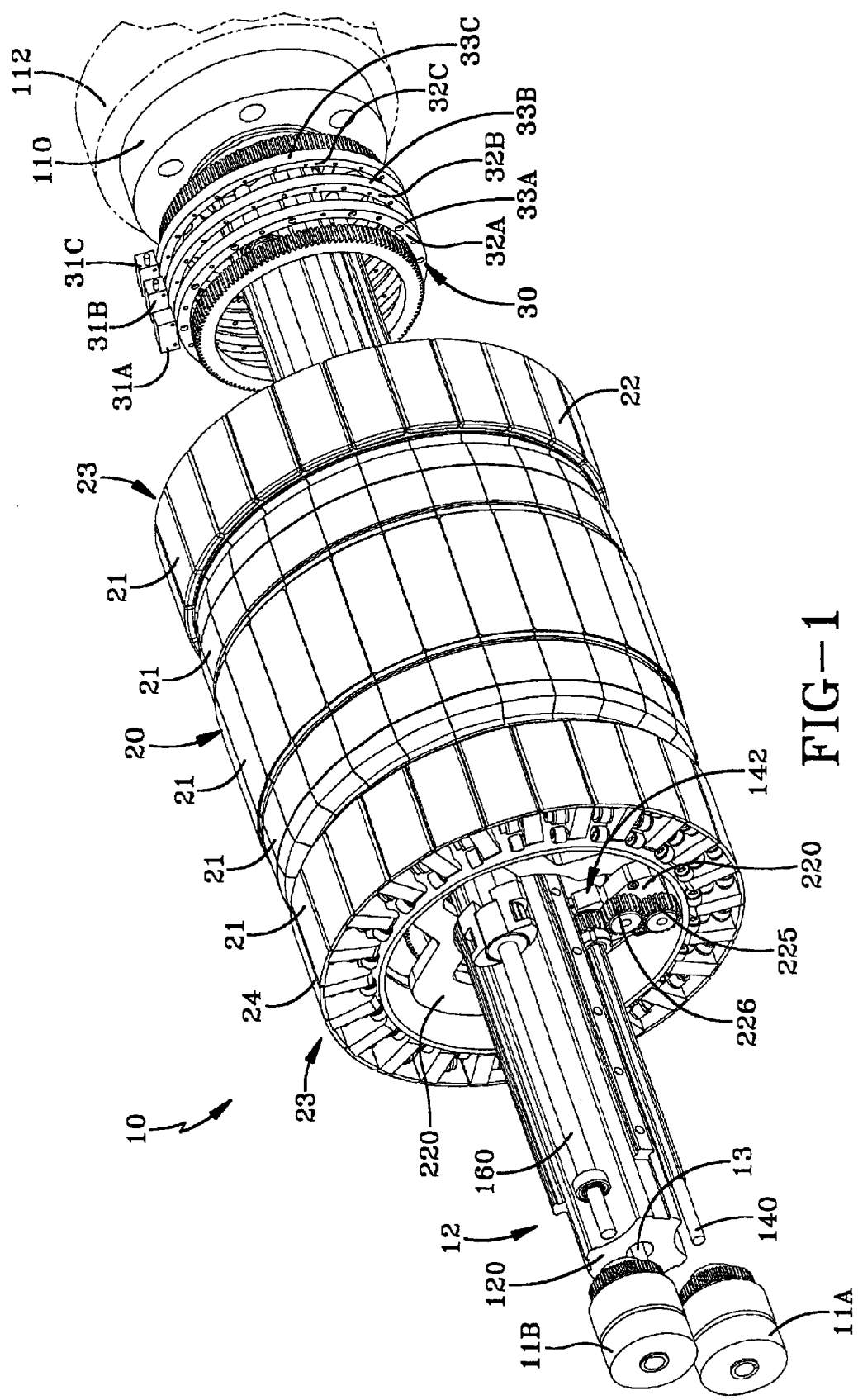
FIG. 1 is a perspective view of the radially expansible drum assembly according to the present invention.
Figure 2:
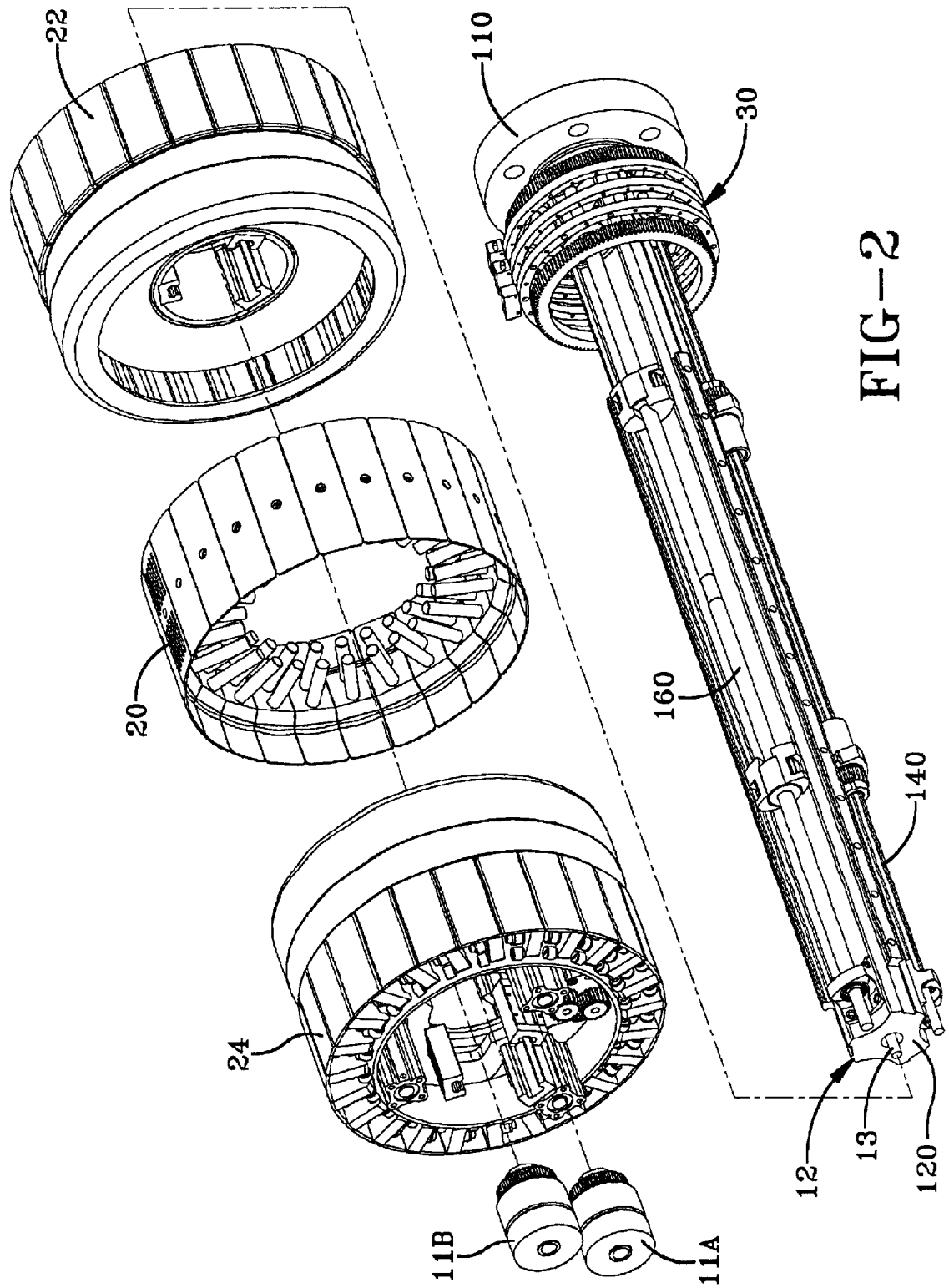
FIG. 2 is a exploded perspective view of the radially expansible drum assembly illustrating the drum core assembly assembly, the differential clutch assembly, the outboard assembly, the center assembly and the inboard assembly and the encoder means.

With reference to FIGS. 1 and 2, the radially expansible assembly drum 10 of the present invention is illustrated. The drum 10 has a unique drum core assembly 12 which includes a spindle 120 connected to a driving shaft 13, which controls the drum rotation, a first external shaft 140 which controls the radial expansion, and a second external shaft 160 that controls the axial expansion or contraction of the drum 10. The first external shaft 140 and the second external shaft 160 is driven by a differential clutch assembly 11. The first external clutch mechanism 11A controls the first external shaft 140, while the second external clutch mechanism 11B controls the second external shaft 160A The drum 10 includes an outboard assembly 24, a center assembly 20 and an inboard assembly 22. The radially outer surface of these assemblies 20, 22, 24 provide a receiving surface 21 upon which a tire can be built. The receiving surface 21 has ends 23, which include the inboard assembly 22 and the outboard assembly 24. The entire receiving surface 21 is radially expandable as well as being axially contractible in such a fashion that an entire first and second stage assembly of a tire can be conducted on the assembly drum 10 as illustrated. The entire assembly drum 10 and drum core assembly 12 is bolted at location 110 to a tire building machine 112, which provides rotation of the primary shaft or spindle 120. Directly in front of the tire building machine attachment location 110 is shown an encoder assembly 30. This three way encoder assembly 30 includes sensors 31A, 31B, 31C, an annular encoder disk 32A, 32B, 32C, each annular disk having a readable surface 33A, 33B, 33C, respectively. The encoder 30 provides a way of identifying the location of the first external shaft 140 relative to the spindle 120 utilizing one of the sensors 31A and one of the disks 32A. A second sensor 31B and disk 32B is used to locate the angular displacement of the second external shaft 160 relative to the spindle 120, and the third encoder sensor 31C and annular disk 32C with readable surface 33C is provided to identify the absolute angular displacement of the spindle 120. In this way, the exact location angularly of each shaft 120, 140 and 160 is known by the combination of sensors. This relative position of the three shafts 120, 140, 160 insures that the exact location of the equipment is precisely known at all times. This enables a computer to establish the precise location of the mechanism at any point in time using real time software. The reason this becomes an important feature of this type of radially expansible assembly drum 10 is due to the fact that through a unique way of radial expansion, this drum 10 has the capability of providing almost an infinite number of diametrically expansible locations within a prescribed range as will be discussed later. This capability enables this drum 10 to build any number of tire sizes in any number of combination of diameters. It further enables the ends 23 to be provided with different diameters such that different bead diameters can be provided to build tires having unique bead diameters on the left side of the tire relative to the right side of the tire. For most applications, tires are symmetrical wherein the beads actually have the same diameter. In some tires, however, the beads may be of a different diameter creating an asymmetric construction. In such a case, it is important that the annular building drum be provided in such a way that it can accommodate different diameter bead cores. As will be discussed later, this radially expansible assembly drum 10 provides a way in which such tires can be easily manufactured in a precise manner.

Figure 3:
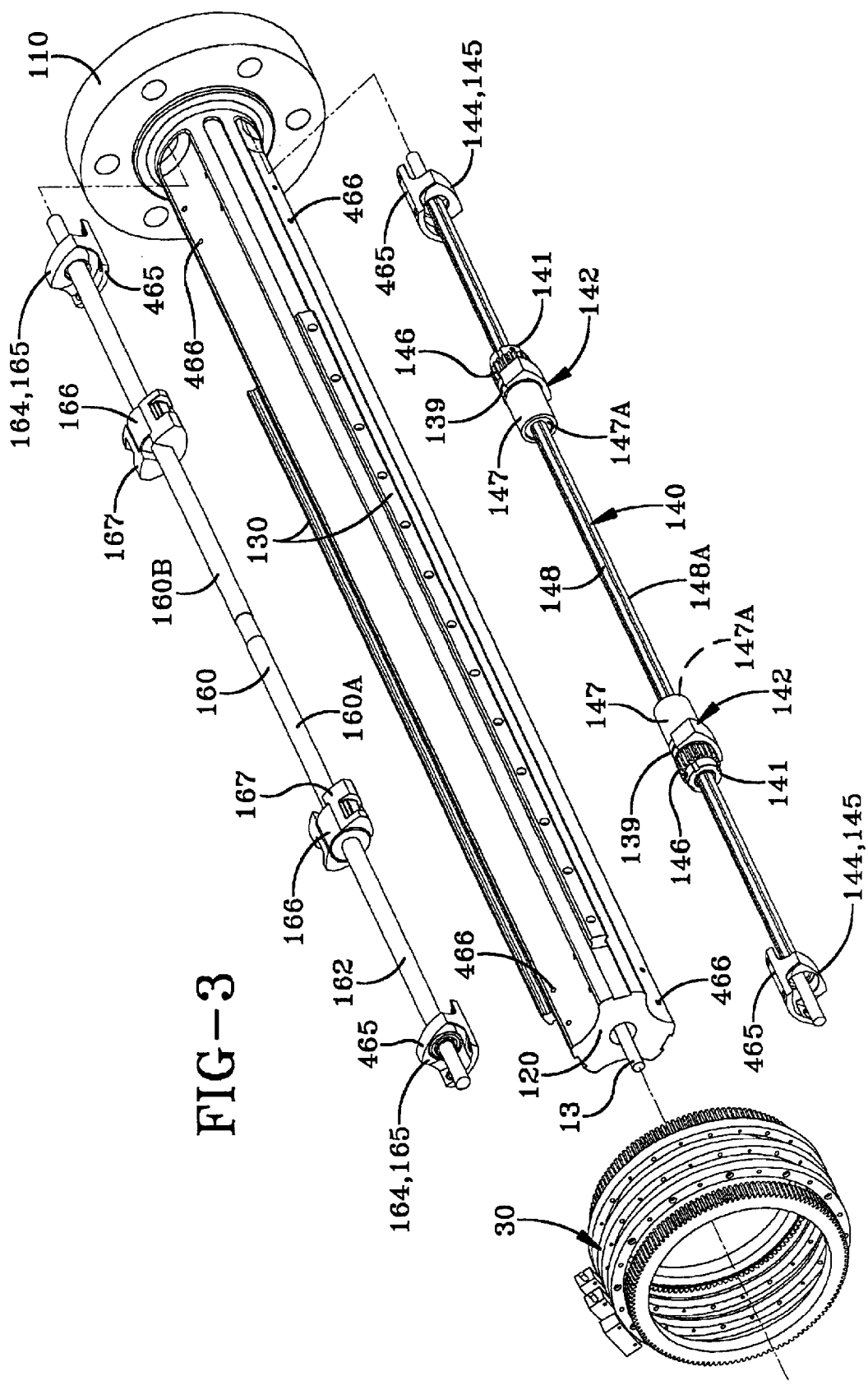
FIG. 3 is an exploded perspective view of the drum core assembly illustrating the center spindle, a first external shaft, a second external shaft and the encoder means.

With reference to FIG. 3, the drum core assembly 12 is shown in an exploded perspective view with the encoder means 30 being shown separated from the drum core assembly 12. The drum core assembly 12 as shown has a spindle 120, which is attached to the tire building machine 112 through the support mechanism 110 as illustrated. The spindle 120 has a cross-section, which has three concave curvatures 420 as illustrated. Lying within two of the concave curvatures 420 is the first external shaft 120 and the second external shaft 160. As illustrated, guide-rails 130 are shown in each location adjacent the concavities 420 on the spindle 120. These guide-rails 130 provide a physical attachment for the outer assembly 221, center assembly 20 and inboard assembly 22 of the radially expansible assembly drum 10, and provide for linear movement of the ends 23 of the outboard and inboard assemblies along these guide-rails 130.

With further reference to the first external shaft 140, the entire control of radial expansion is transmitted through this shaft. The shaft 140 as illustrated, has a slot 148A as illustrated, the slot 148A provides a key way for the spline gear assemblies 142, which are shown on each side of the shaft. The spline gear assembly 142 includes a spline gear which is keyed to the shaft slot 148A, a bearing housing 139 and a spline sleeve 147 which includes a ball spline nut 147A internal of the spline sleeve 147. The spline sleeve 147 passes through the bearing 139 and is connected to the lock nut 141. The combination of the pair of spline gear assemblies 142 and the shaft 140 provide radial expansion of the assembly drum 10. At each end of the shaft 140 there is a bearing housing 144, including a bearing 145 as illustrated. The bearing housing 144 has openings 465 as illustrated for attaching the shaft 140 directly to the spindle 120 as illustrated at the threaded holes 466.

With reference to the second external shaft 160 as shown in the upper portion of FIG. 3, this shaft provides for the linear movement of the assembly drum ends 23 inwardly and outwardly. This movement is provided by having a threaded shaft 160 wherein the threaded shaft at one end 160A is oppositely threaded relative to the shaft at the other end 160B. These two shaft portions 160A and 160B are illustrated at 160A and 160B of the figure. The roller nut housing 167 includes a threaded bearing 166, called a roller nut, that engages the threaded portion 160A or 160B of the shaft 160 and provides linear movement for the assembly drum 10. One of these roller nuts housings 167 is provided at each end of the shaft 160 and as previously discussed, they move in opposite directions when the differential clutch 11B is engaged and as the shaft 160 is rotated, the roller nut housings 167 move inwardly upon one rotation direction of the shaft 160 and outwardly on an opposite rotation direction of the shaft 160. At each end of the shaft 160 is attached a bearing housing 165 having an internal bearing 164, the bearing housing 165 has four openings 465 for which threaded fasteners can be provided to attach the shaft 160 to the spindle 120 as illustrated at the threaded holes 466.

With reference to FIGS. 4 through 18, a detailed discussion of the outboard assembly 24 and the inboard assembly 22 follows. Throughout this discussion, it is important to note that the mechanisms of the outboard assembly 24 are identical to those of the inboard assembly 22, with the exception of accommodations for building a tire having different bead diameters. In those cases where the tire is built with the same diameter, the inboard and outboard assembly will be virtually identical only facing in opposite directions on the shaft 12 with the center assembly 20 interposed therebetween. In the example provided in the figures, the diameters of the outboard assembly and the inboard assembly, as it relates to the tire being constructed, are designed to accommodate tires of different diameters relative to the inboard sidewall and the outboard sidewall of the tire.

Figure 4:
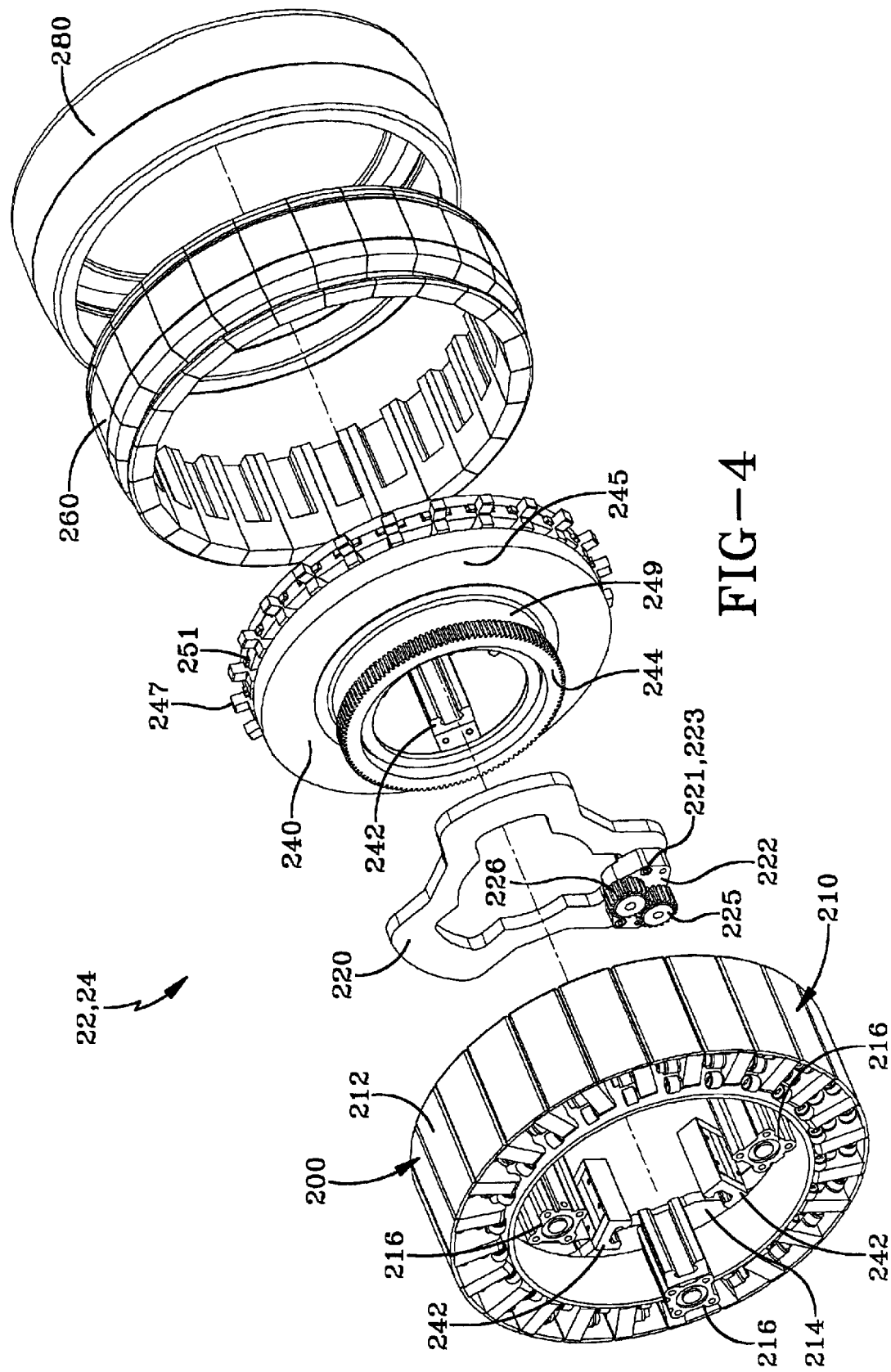
FIG. 4 is an exploded perspective view of the outboard assembly, it being understood that the inboard assembly is identical to the outboard assembly with the exception of being turned in the opposite direction, and in some cases having a bead diameter not equal to the outboard assembly.

With reference to FIG. 4, a turn-up assembly 200 is illustrated on the far left lower corner of the figure. Adjacent to the turn-up assembly 200 is shown a carrier assembly 220. Adjacent to the carrier assembly 220 is a diameter control assembly 240. Adjacent the diameter control assembly 240 is a radially expandable segment set 260. Adjacent the segment set 260 is a seal assembly 280. The seal assembly 280 provides a means for covering the ends 23 of the outboard assembly 24 and the inboard assembly 22. As shown, the sealing assembly 280 can be a flexible membrane.

Figure 5:
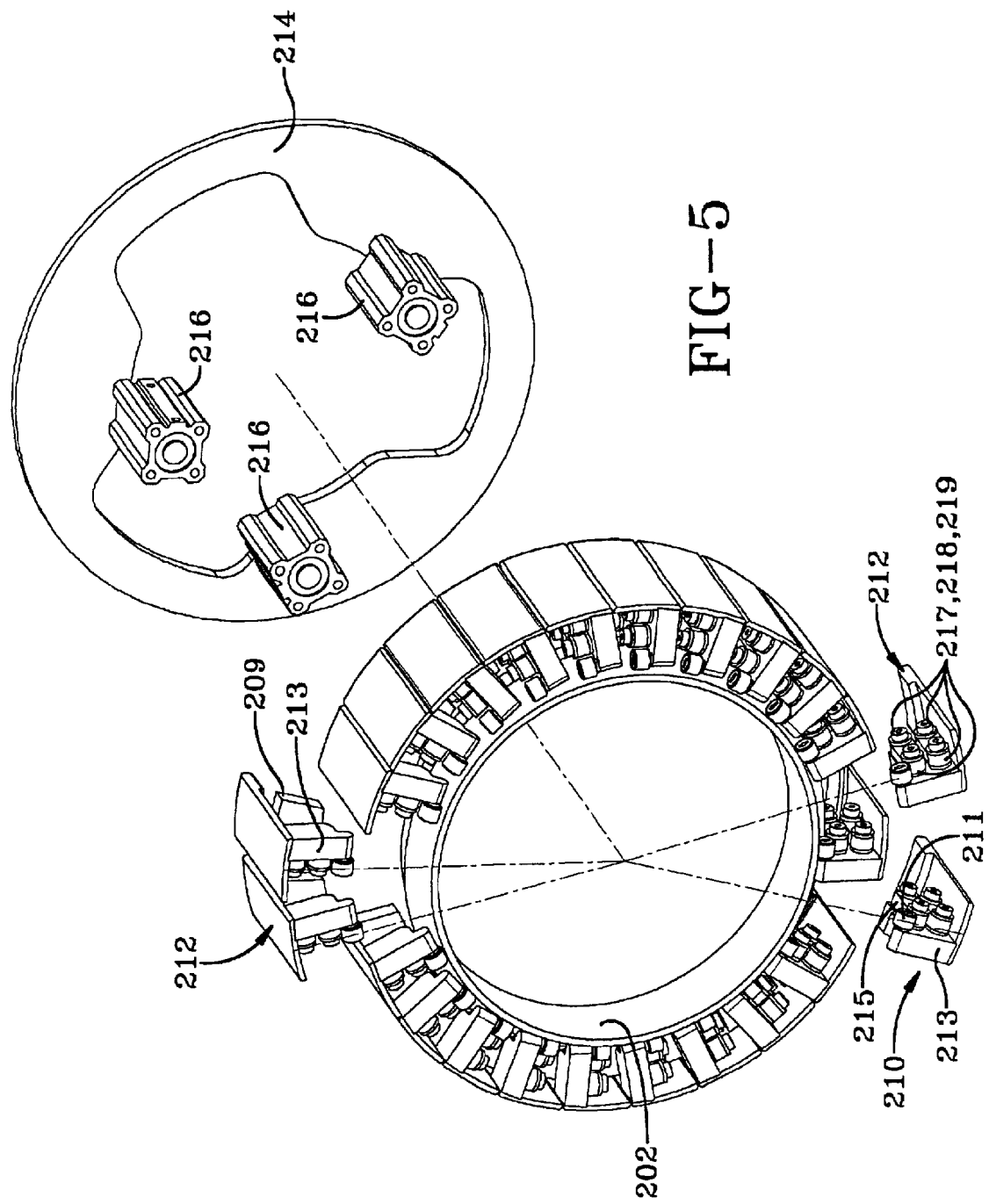
FIG. 5 is a perspective of a portion of the inboard assembly illustrating mechanisms for radially expanding a portion of the receiving surface.
Figure 6:
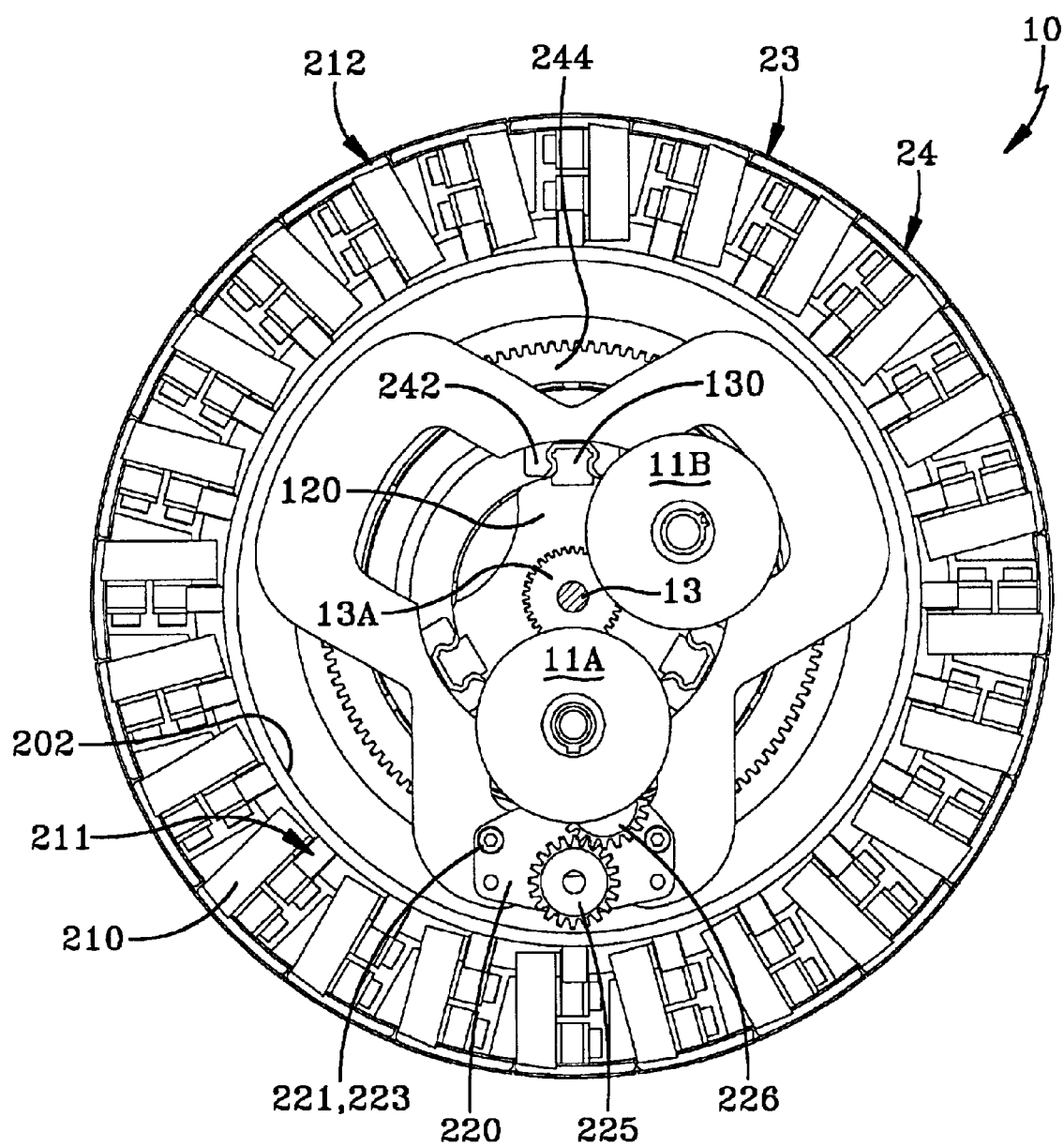
FIG. 6 is an end view of the radially expansible drum according to the present invention.

Attention is drawn to the FIG. 5 wherein the turnup assembly 200 is shown in detail in an exploded view. Each turnup assembly 200 includes a plurality of turn-up segment sets 212, a cam ring 202 on which the sets 212 rest. Each turnup segment set 212 includes a linkage assembly 210. The linkage assembly 210 includes a follower block 213, an anchor block 209 and a pair of linkage arms 215. The follower block 213 is rigidly attached to the axially outer portion of the segment set 212. At a radially inner location the cam follower 211 is attached to the cam follower block 213 in such a way that the cam follower 211 rides along the cam surface 202. As the cam follower 211 rides along the surface 202, it raises the cam follower block 213 moving the entire segment 212 radially outwardly as it is traversed radially inwardly. The cam follower block is connected to an anchor block 209 by a link arm mechanism having a pair of link arms 215, the link arms 215 are attached to both the follower block 213 and the anchor block 209 by a plurality of bearings sets, having bearing 219, lock washer 217, and screws 218 holding the bearings in place. This enables the link arm 215 to pivot providing the necessary movement of the segment sets 212.

With further reference to FIG. 5 in the upper right-hand portion is shown a pusher ring 214. Attached to the pusher ring 214 are three cylinders 216. These cylinders 216 are attached to the pusher ring 216 and as are further illustrated in FIG. 4, the cylinders are attached to the linear bearings 242. As illustrated in the end view of FIG. 6, the linear bearings 242 connect with the guide rails 130 to provide linear movement of the segments 212 during an operation known as a turn-up during the assembly of the tire. There are 24 equally spaced turn-up segments 212. As shown, these segments are equally spaced around the peripheral surface of the cam ring 202. A linear actuation of the cylinders 216 causes the cam follower bearing 211 to roll on a cam surface of the cam ring 202, which then moves the linkage assembly 210 to lift the outer portion of the turn-up segment 212 to move it both radially outwardly and to move it laterally inwardly to effect a turn-up of the tires ply and liner.

Figure 7:
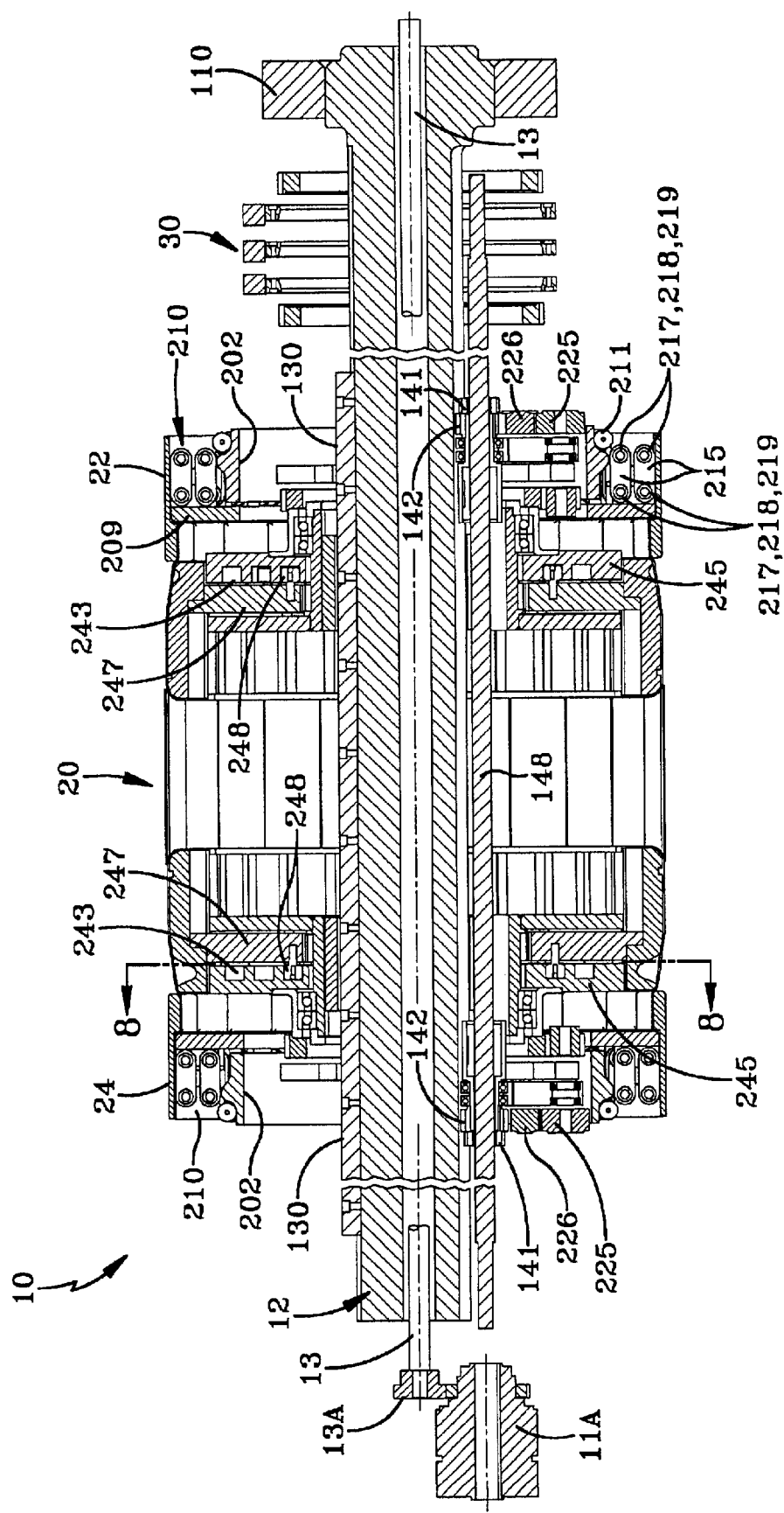
FIG. 7 is a cross-sectional view of the radially expansible drum according to the present invention.

With reference to the radially expandable assembly drum 10 as shown in the cross-sectional view of FIG. 7, all of the previously discussed components are shown in the assembly. In addition to the previously mentioned components, a drive gear 13A is shown, which is adapted to fit in the center of the main drive shaft 120, this gear 13A is shown connected to the drive clutch 11A. Along lines 8—8 of the cross-sectional view of FIG. 7 is shown a cam disk 245. As illustrated in FIG. 8, cut into the cam disk 245 is a spiral groove 243. The spiral groove 243 is cut on a constant rate increasing angle such that a 360° rotation of the drum creates a 40 mm diametrically outward movement from an initial 0° location to the 360° location. As shown, the drum 10 actually can rotate beyond 360° relative to the axis of drum rotation in such a fashion that the disk 245 as shown can radially expand along the cam follower groove 243 to a diametrical increase of 50 mm.

Figure 10:
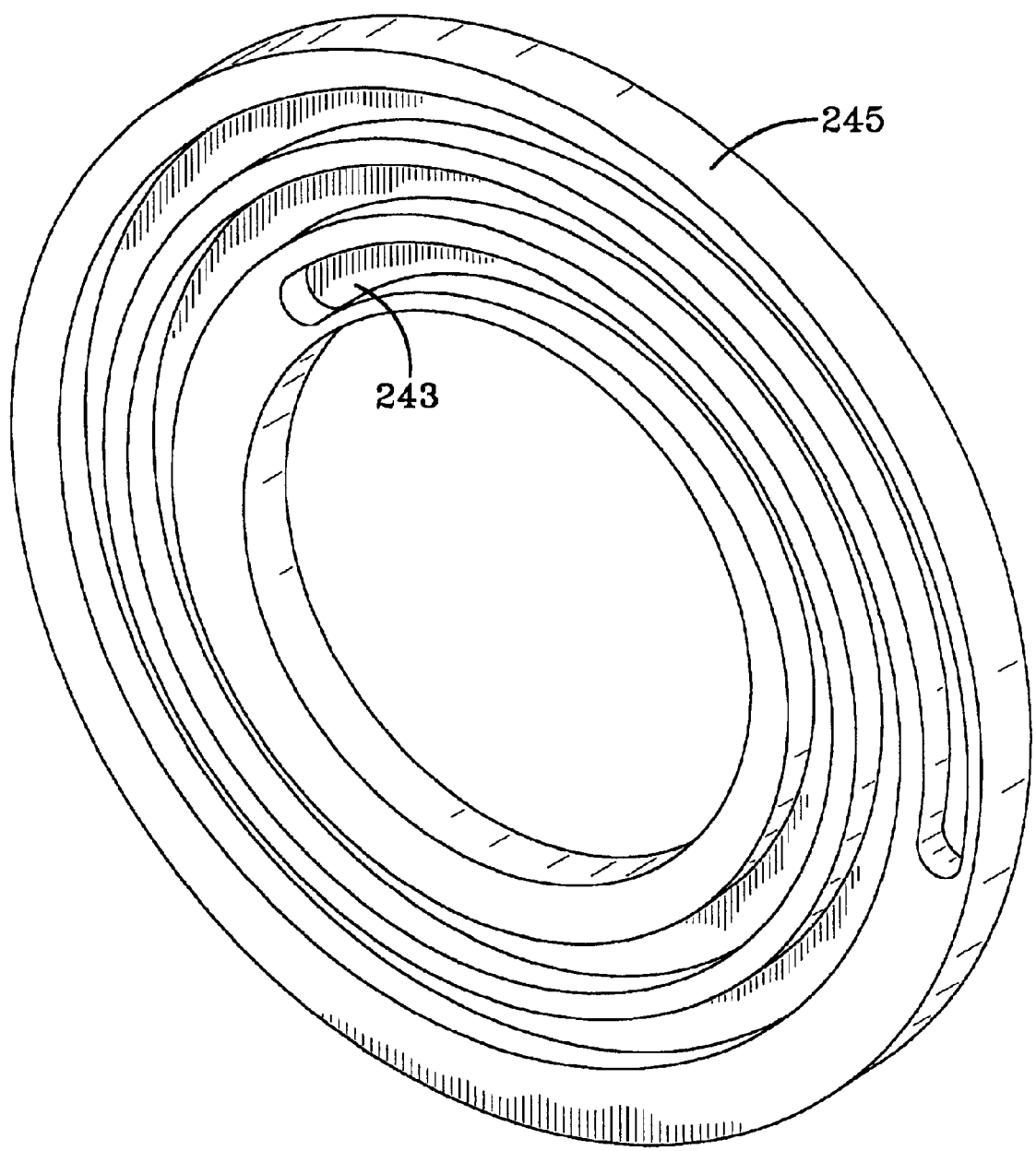
FIG. 10 is a perspective view of the cam follower disk.

FIG. 9 shows a cross-sectional view of the cam disk 245 with the cam follower groove 243. FIG. 10 shows a perspective view of the cam follower disk. It is understood that both the inboard and outboard assemblies 22 and 24, respectively, each have a cam follower disk.

Figure 11:
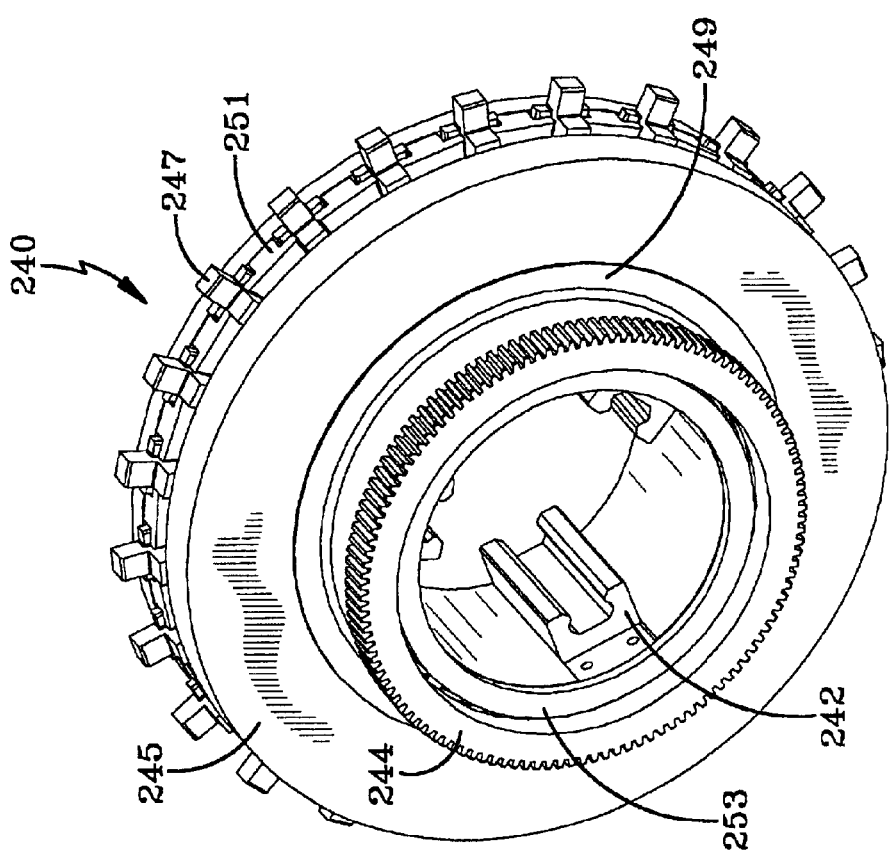
FIG. 11 is a perspective view of the diameter control assembly of the present invention, the diameter control assembly being a component of the inboard assembly and the outboard assembly.

With reference to FIG. 11, the cam follower disk 245 is shown as part of the diameter control assembly 240. Outward of the cam follower disk 245 is shown a bearing sleeve 249 which presses up against the cam follower disk 245 and covers a pair of bearings 252 illustrated at FIG. 18, the bearing sleeve 249 abuts up to the gear 244 as illustrated, entire assembly is then retained by the lock ring 253 shown internal of the gear 244.

Figure 12:
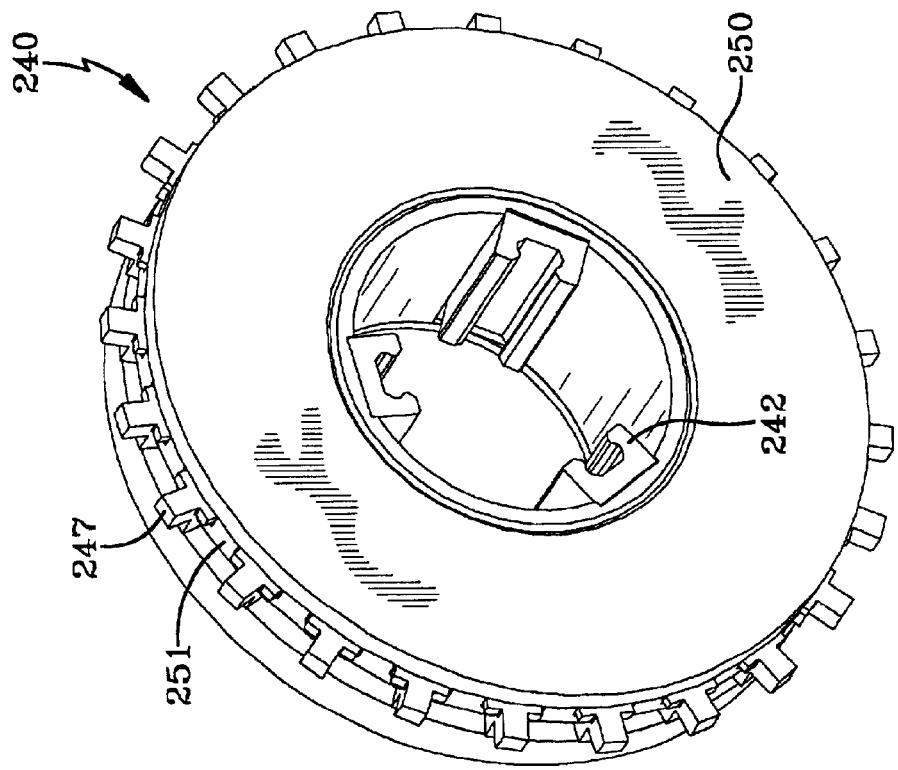
FIG. 12 is another perspective view of the diameter control assembly.

With reference to FIG. 12, a support ring 250 is shown. Interposed between the support ring 250 and the cam disk 245 is shown a plurality of slide assemblies 247. In between each slide assembly 247 is a keeper or retaining spacer 251.

Figure 14:
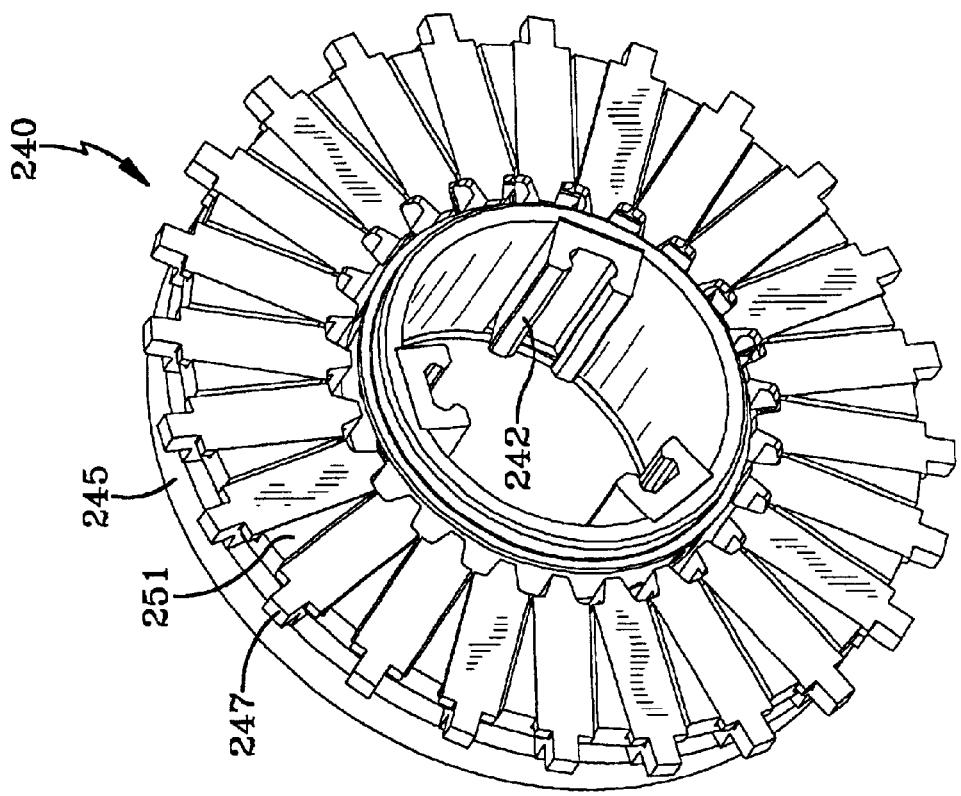
FIG. 14 is a perspective view taken from the perspective of FIG. 12 with the support ring removed so that the opposite side of the slide mechanism can be shown.
Figure 13:
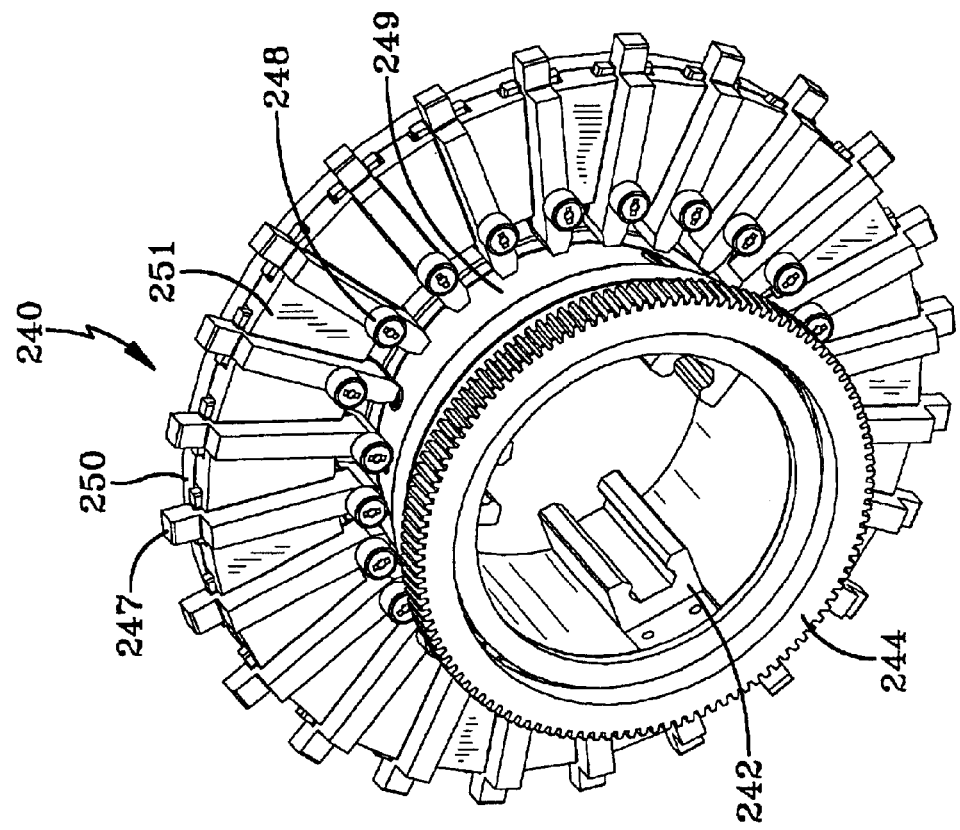
FIG. 13 is a perspective view of the diameter control assembly having the cam disk removed exposing the slide mechanisms for radially expanding the receiving surface of the radially expansible assembly drum.

With reference to FIGS. 13 and 14, two perspective views are shown of the diameter control assembly 240. In FIG. 13, the cam disk 245 is removed exposing the mechanisms that provide for radial expansion of the drum 10. The slide assembly 247 has a cam follower bearing 249. The cam follower bearing 248 is designed to fit in the spiral groove 243. As shown, the cam follower bearings 248, as one traverses counterclockwise around the view of FIG. 12, increases in radial displacement outwardly. This radial displacement increase of the cam follower bearings 248 is designed to the same exact increase in the spiral cam follower groove 243. This insures that as the drum 10 rotates, each cam follower 248 is moved precisely the same radially dimension outwardly, or inwardly as the case may be. By doing this, the radially outer surface of the slide assemblies 247 all precisely move at the same rate; therefore, every movement of the drum creates an exact and precise diameter at every location 360° around the drum's outer surface 21. This is true upon any angular movement of the drum, inwardly or outwardly. This feature provides the assembly drum 10 with an infinite number of preselected diameters within a prescribed range of the spiral groove 243.

With reference to FIG. 14, the backside of the assembly 240 is shown wherein the slide assembly is 247 are shown spaced by the retaining spacer 251. As shown from the backside, the retaining spacers 251 effectively are all positioned on a radial line that intersect the exact axis of rotation of the drum 10. The slide assemblies 247 then slide between these retaining spacers 251 on a radial movement outwardly or inwardly, depending on the rotation of the drum 10. As shown, linear bearings 242 are on the radially inner surface of the assembly 240. These linear bearings 242 provide for axial Li movement or linear movement inwardly or outwardly as required.

Figure 16:
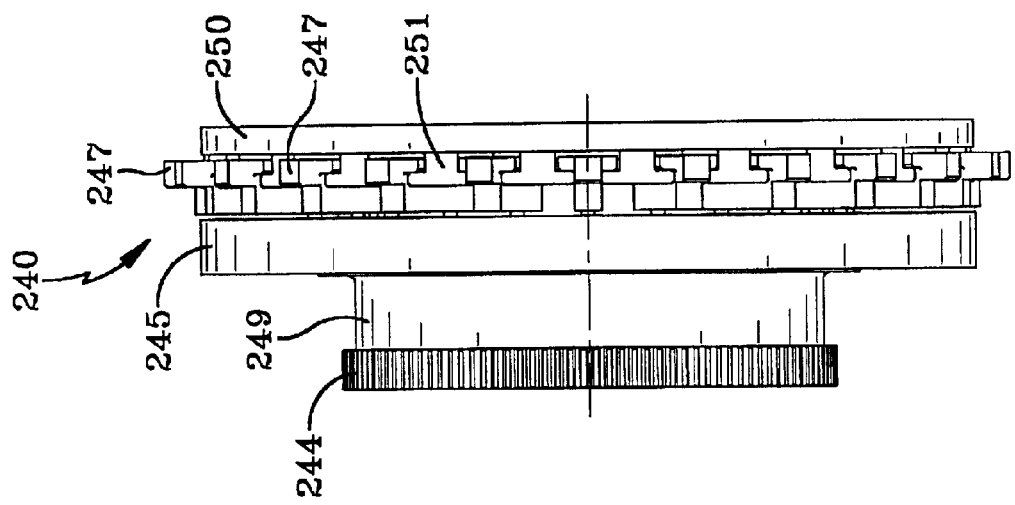
FIG. 16 is an end view of the diameter control assembly taken from FIG. 1.
Figure 15:
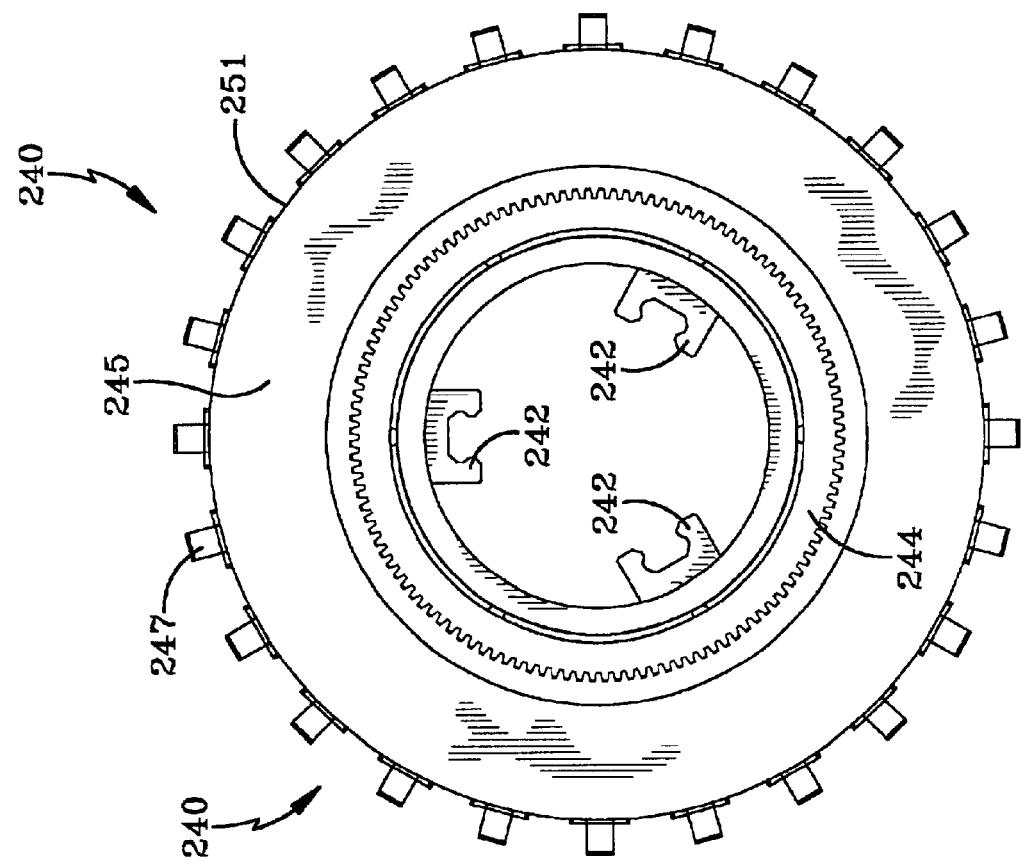
FIG. 15 is a plan view of the diameter control assembly taken from FIG. 11.
Figure 18:
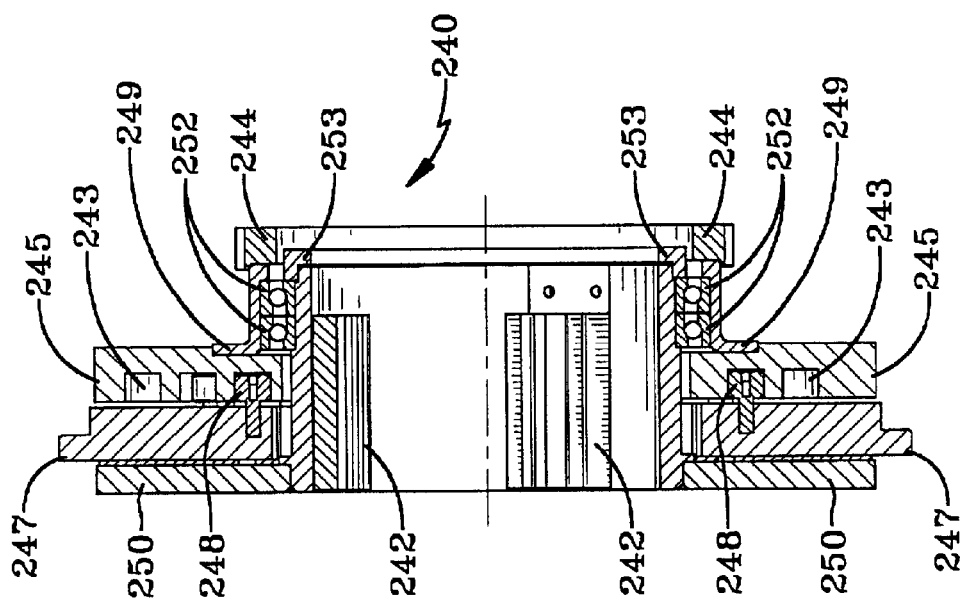
FIG. 18 is a cross-sectional view of the diameter control assembly.
Figure 17:
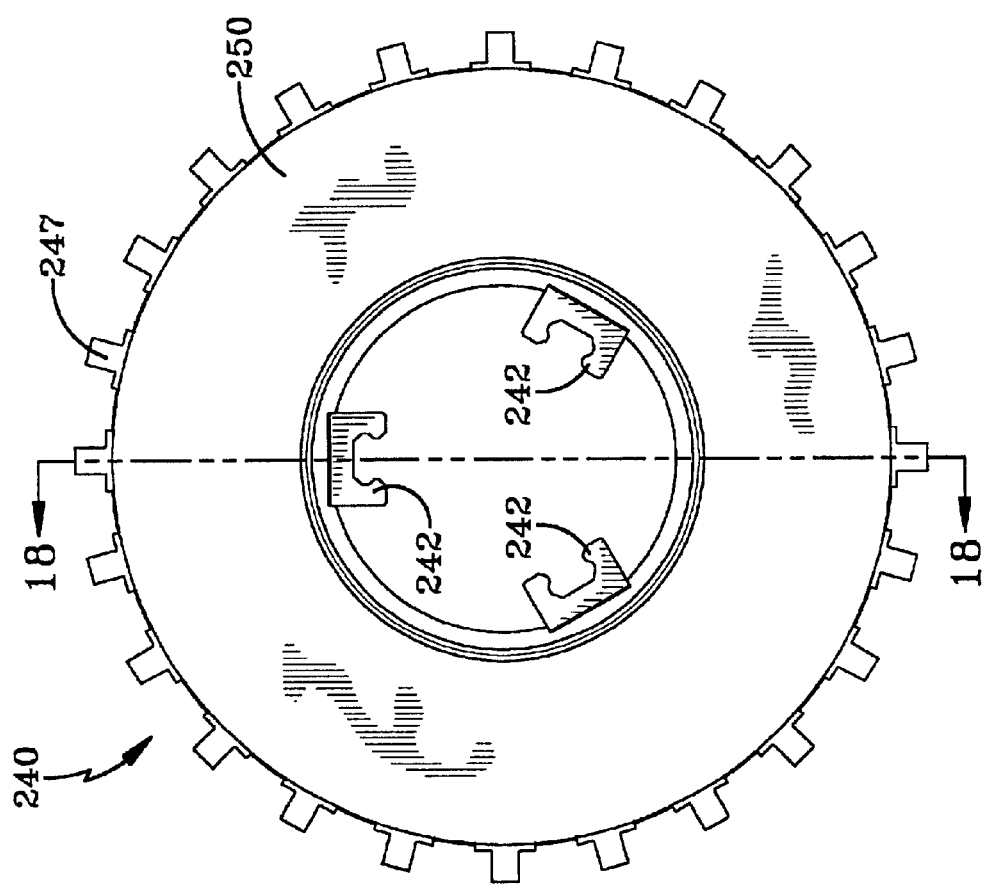
FIG. 17 is the opposite plan view of the diameter control assembly taken from FIG. 12.

FIGS. 15 and 16 further illustrate side and end views of the diameter control assembly 240, while FIG. 17 shows the opposite side of the diameter control assembly 240 and along lines 18—18 of FIG. 17 is a cross-sectional view of FIG. 18, showing all of the internal mechanisms of this diameter control assembly 240. As shown, the cam disk 245 has the spiral groove 243 illustrated with the cam follower bearing 248 shown attached to the slide assembly 247 and located in a portion of the spiral groove 243. The bearing sleeve 249 presses against the cam disk 245 and the support ring 250, thereby holding in the slide assemblies 247 and the spacers 251. Directly underneath the bearing sleeve 249 are two roller bearings 252 that are retained by the bearing sleeve 249 and the lock ring 253 as illustrated. Adjacent the bearing sleeve 249 is the gear 244. Internal of the diameter control assembly 240 is shown the linear bearings 242. These bearings 242 are attached to the guide rails 130. These components make up the primary features of the assembly drum 10. When assembled, the diameter control assembly is radially inward of the radially expandable segment set 260, and the seal assembly 280.

Figure 19:
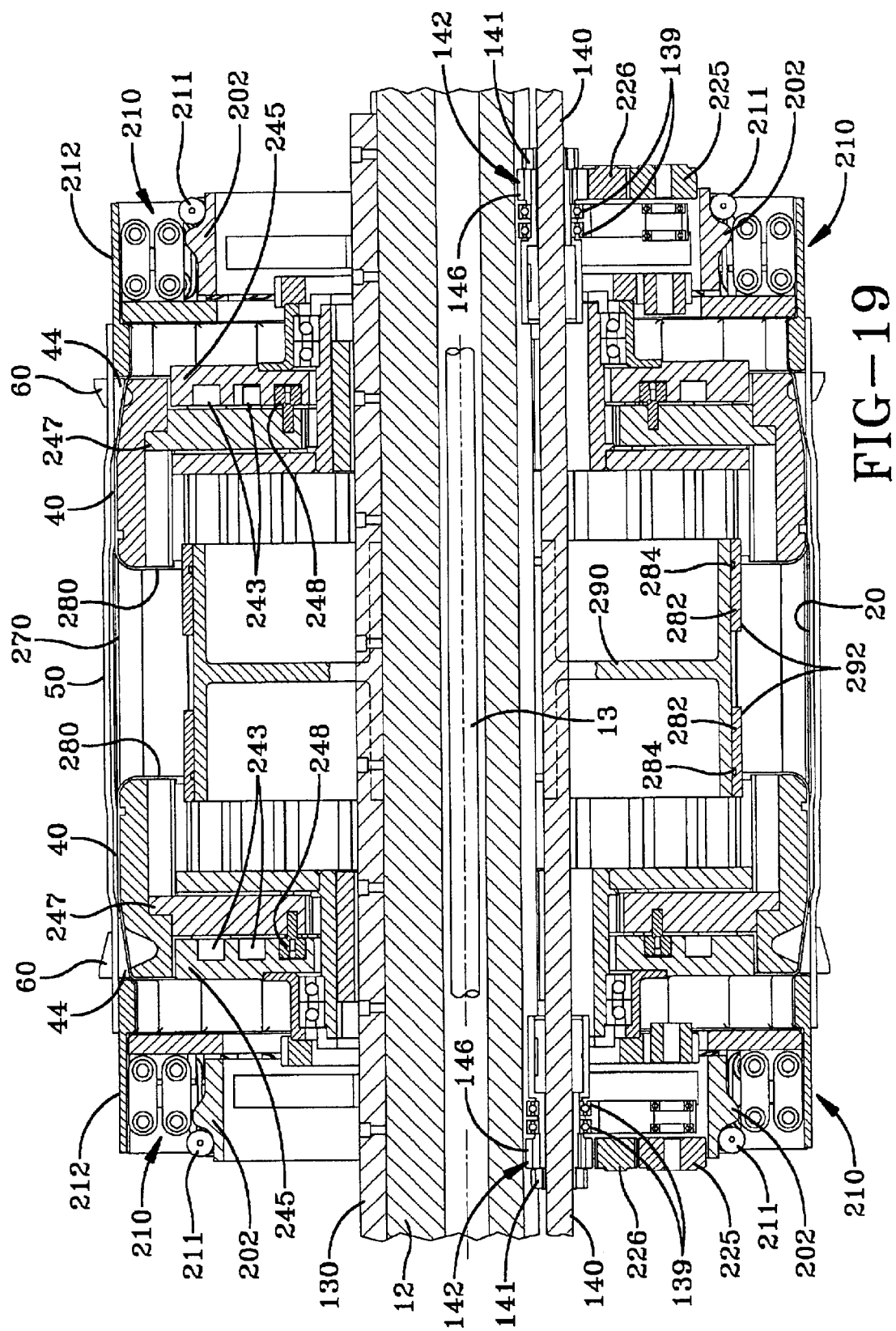
FIG. 19 through FIG. 26 illustrates the radially expandable assembly drum in various stages of tire building.

As shown in FIG. 19 at the center of the assembly drum 10, is a center support member 290. The center support member is mounted to the spindle 120 and extends radially outwardly and has a cylindrically shaped outer surface having a pair of annular rings 292 on each side of the support member 290. Internal of annular rings 292 and between the support member 290 are pairs of seals 284 and 282. Attached to the support rings is the flexible sealing member 280 on each side of the assembly drum 10. Outward of the assembly drum 10 is the center assembly 20. These features provide an airtight seal from which vacuum and pressure can be transferred to the components.

The sequence of drum operation for the building of a tire according to the present invention will now be described.

As shown in FIG. 19, an innerliner 40 is first applied to the radially outer surface 21 of the assembly drum 10, otherwise known as the receiving surface 21. Preferably, a vacuum is applied to one center deck segment 262 of the drum to hold the leading edge of the innerliner 40 to the drum 10. The entire drum 10 rotates to apply the innerliner 40. One or two layers of innerliner 40 may be applied. Then a split chafer 44 is applied on both the left and right side of the inboard and outboard assemblies 22,24 of the drum 10. The exposed radial faces of the segments 262 and the inside lateral faces of the turn-up segments 212 form notches into which the split chafer 44 fits as illustrated. The inside edge of the split chafer 44 will overlap on the top of the outside edges of the innerliner 44 as shown. The entire drum 10 rotates to apply the split chafers 44. After application of the split chafers 44, the outside diameter on the drum 10 along with the turn-up segments will present an approximately flat cylindrical surface for application of subsequent components.

Next, the ply stock 50 in one or two layers is applied. The ply stock 50 will completely cover the inner liner 40 and the split chafers 44. The outer edges of the ply stock 50 will overlap on the top of the turn-up segments 212 at the outer ends 23 of the drum 10. The ply stock 50 may be preassembled with an outboard gumstrip and an inboard gum strip aligned with the outboard and inboard edges of the ply. Alternatively, gum strips may be applied on the exposed radial faces of the turn-up segments prior to the application of the ply stock 50 on the drum 10. The ply stock 50 is applied by rotating the entire drum 10. Next, hard rubber inserts called talons 60 are placed on top of the ply stock 50 on both the left and right diameter control mechanisms 240. The outside vertical faces of the talons 60 are positioned just axially inside of the inside faces of the turn-up segments 212. The outside vertical faces on the talons 60 will define the line of folding for the ply turnups. The talons 60 are applied by rotating the entire drum 10. After application, the joining ends of the talons 60 are stitched.

Figure 20:
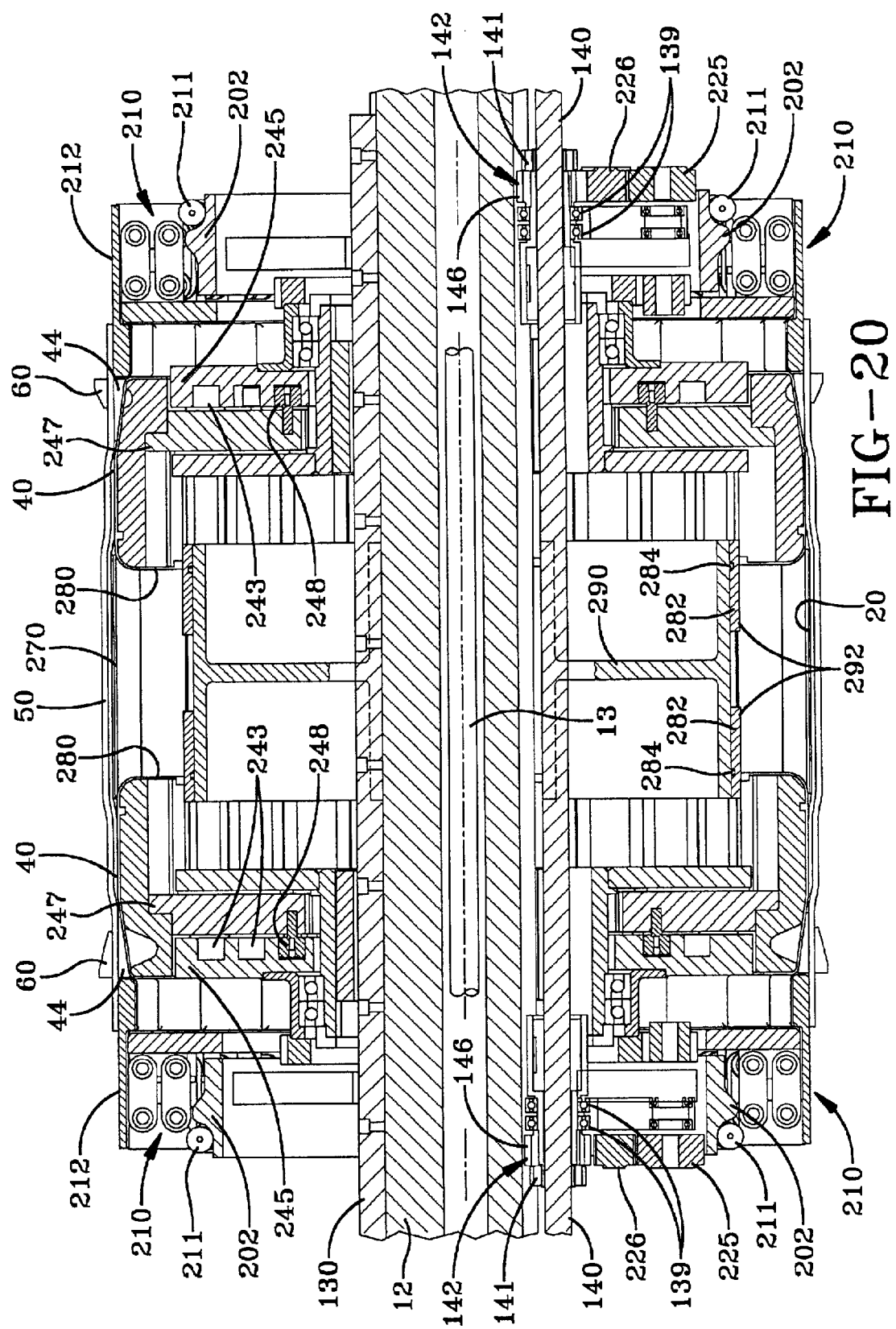

Next as illustrated in FIG. 20 a slight increase of the diameter of the left diameter control assembly 240, and the right diameter control assemblies 240 is accomplished to increase the hoop tension in the talons 60. The diameter control assemblies 20 are operating simultaneously via common rotating ball spline shaft 140. The ball spline shaft 140 imports a rotation to the spiral cam disk 245 in each diameter control section 240 relative to the overall drum. The rotation of the spiral cam disk 245 causes the radial motion of the slide assemblies 247 supporting the individual drum segments 240. The set of center deck segments 270 rest on the outside of the flexible sleeves 280 of the left and right diameter control assembly 240, so the radial movement of the decks 270 will follow the diameter of the diameter control assembly 240. This motion is typical for all diameter changes of the drum 10.

Figure 21:
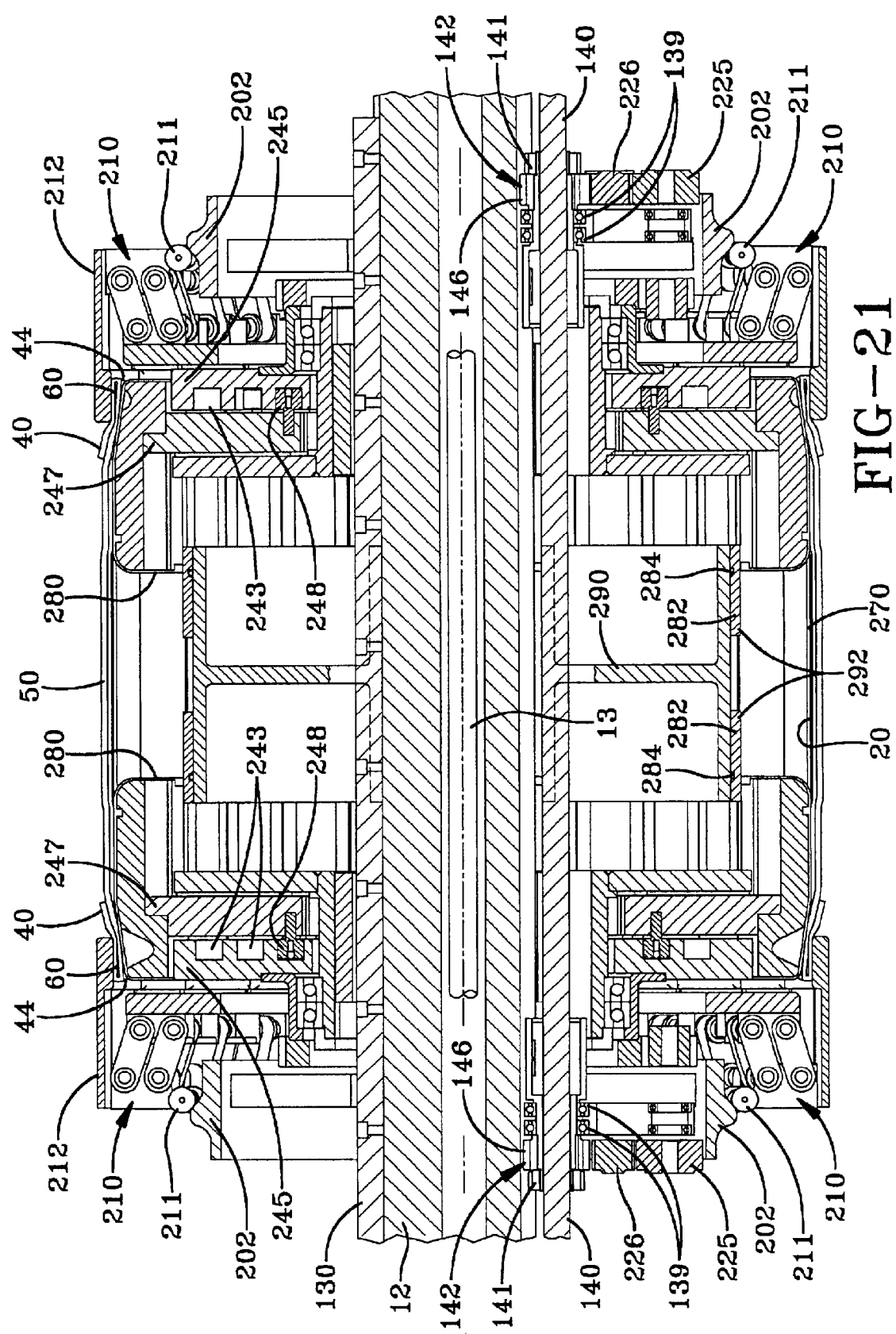

With reference to FIG. 21, the turn-up of the ply endings over the talons 60 is accomplished as illustrated. The turn-up action is initiated by actuating air cylinders 216 which move a common pusher ring 214, on each turn-up section, the motion of the pusher rings 214 causes the numerous turn-up segments 212 to move simultaneously. Due to the shape of the common cam ring 202 on each of the turn-up sections 212, the initial movement is radially outward followed by progressively more axial motion. The overall motion causes the ply endings to be forced up and over the talons 60 and on to the ply stock 50. Once the tun-ups are affixed to the ply stock 50, the air cylinders 216 are reversed causing the pusher rings 214 to move in the opposite direction thereby retracting the turn-up segments 212.

Figure 22:
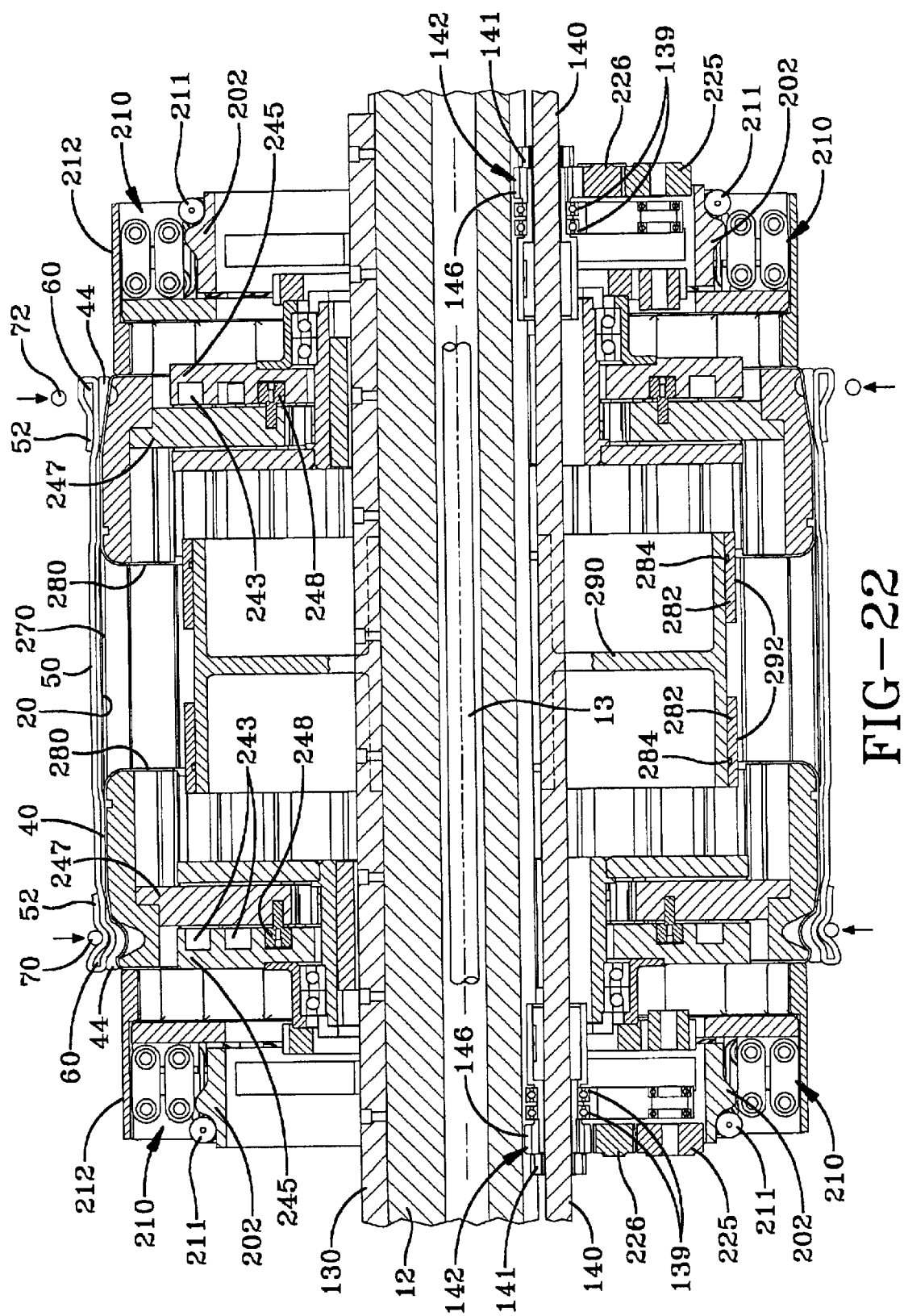

With reference to FIG. 22, the next sequence of the tire building requires the beads 70 and 72 to be moved over the drum 10 in an axial direction. The beads 70,72 are positioned directly above the bead pockets 274,275 formed in the segments 262 of the diameter control sections 260. Once the beads 70,72 are positioned directly over these pockets or grooves 274,275 formed by the segments 262, then the diameter is increased on the left and right diameter control sections 240 until the smaller bead 70 is just making contact with the turn-up on the outside of the folded ply 50. As the bead 70 makes contact with this ply turn-up, the support mechanisms or arms 270 disengage deflecting radially inwardly of the segments 262. These features will be discussed later and are as shown in FIGS. 27A, 27B, 28A, 28B and FIGS. 29A and 29B. After the smaller bead 70 makes contact, the diameter of the left and right control sections is increased further until the larger bead is making contact with the gum strip on the outside of the folded ply 50. At this point in time, the support mechanisms or arms 270 are disengaged, deflecting to allow the larger bead diameter to fully engage into the bead pocket 275. At this point, this increase in diameter enables both beads 70,72 to be fully seated in their respective bead pockets 274,275.

Figure 23:
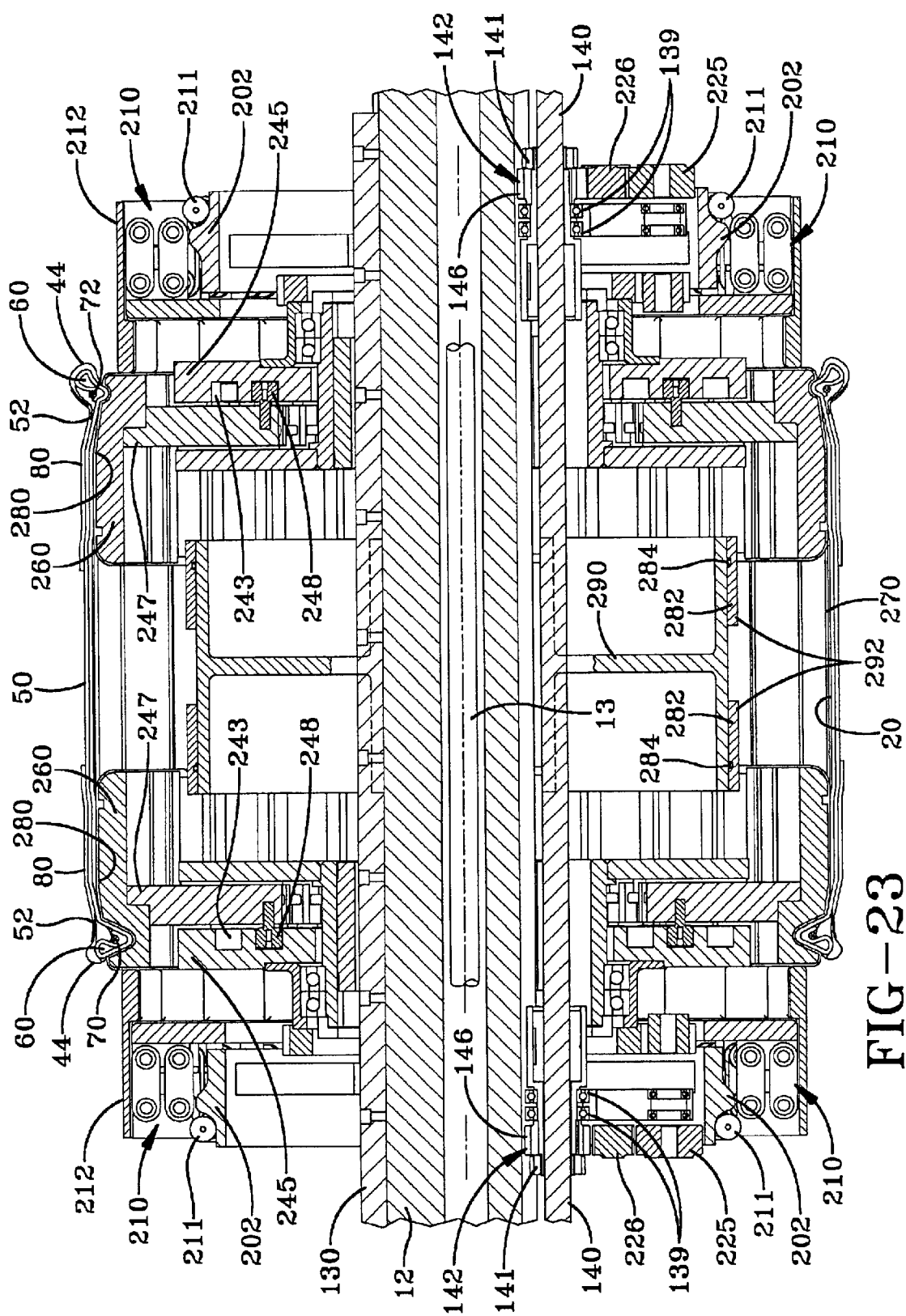
Figure 24:
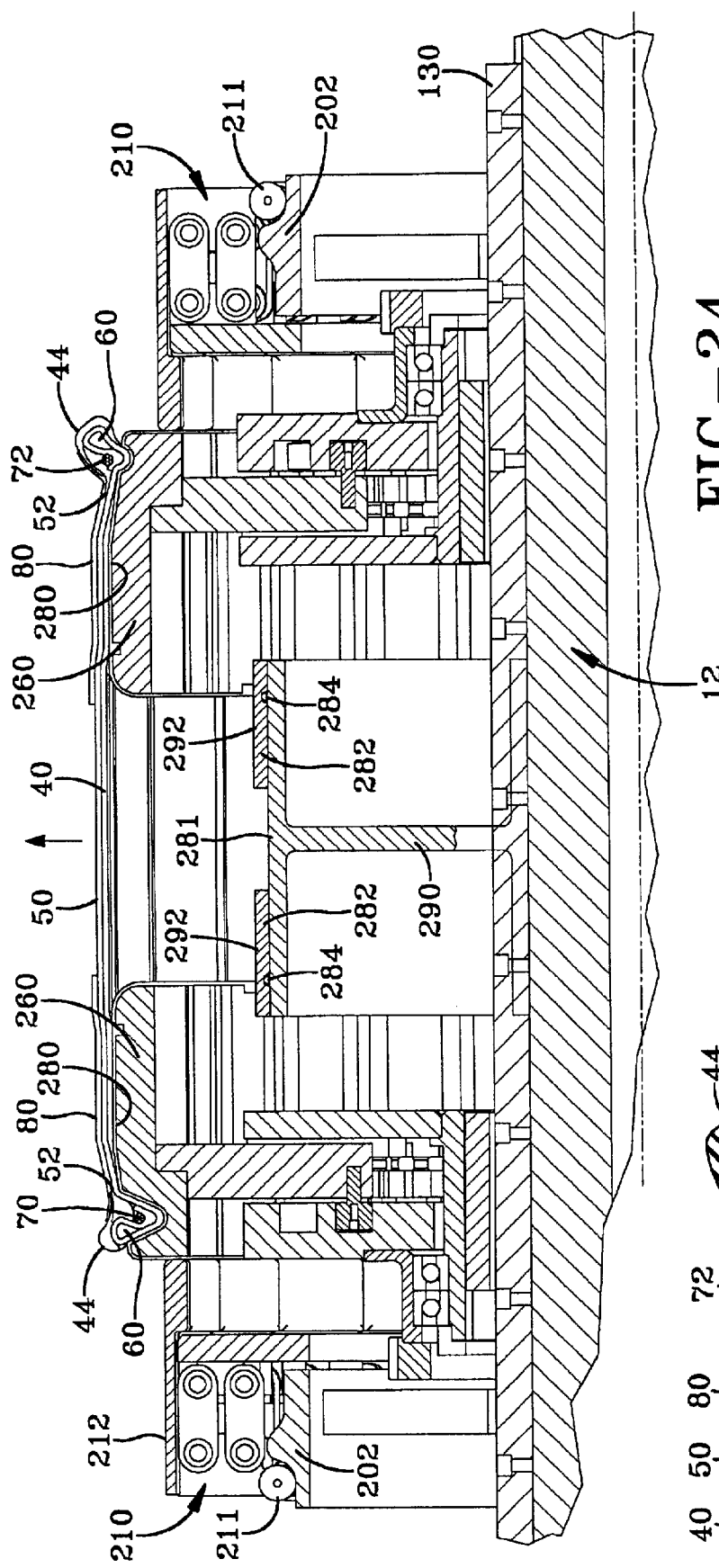
Figure 24A:
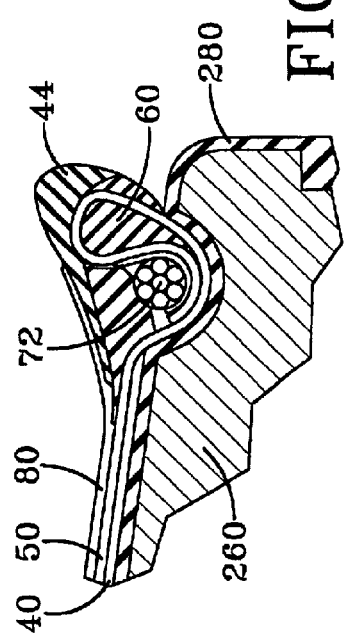

With reference to FIG. 23, the remaining components of the tire carcass, including, but not limited to an apex, a split chafer joining with the exposed face of the split piece of split chafer applied earlier, and sidewall material is added and the entire drum 10 is rotated for application of these components. This is further illustrated in FIGS. 24 and 24A.

Figure 25:
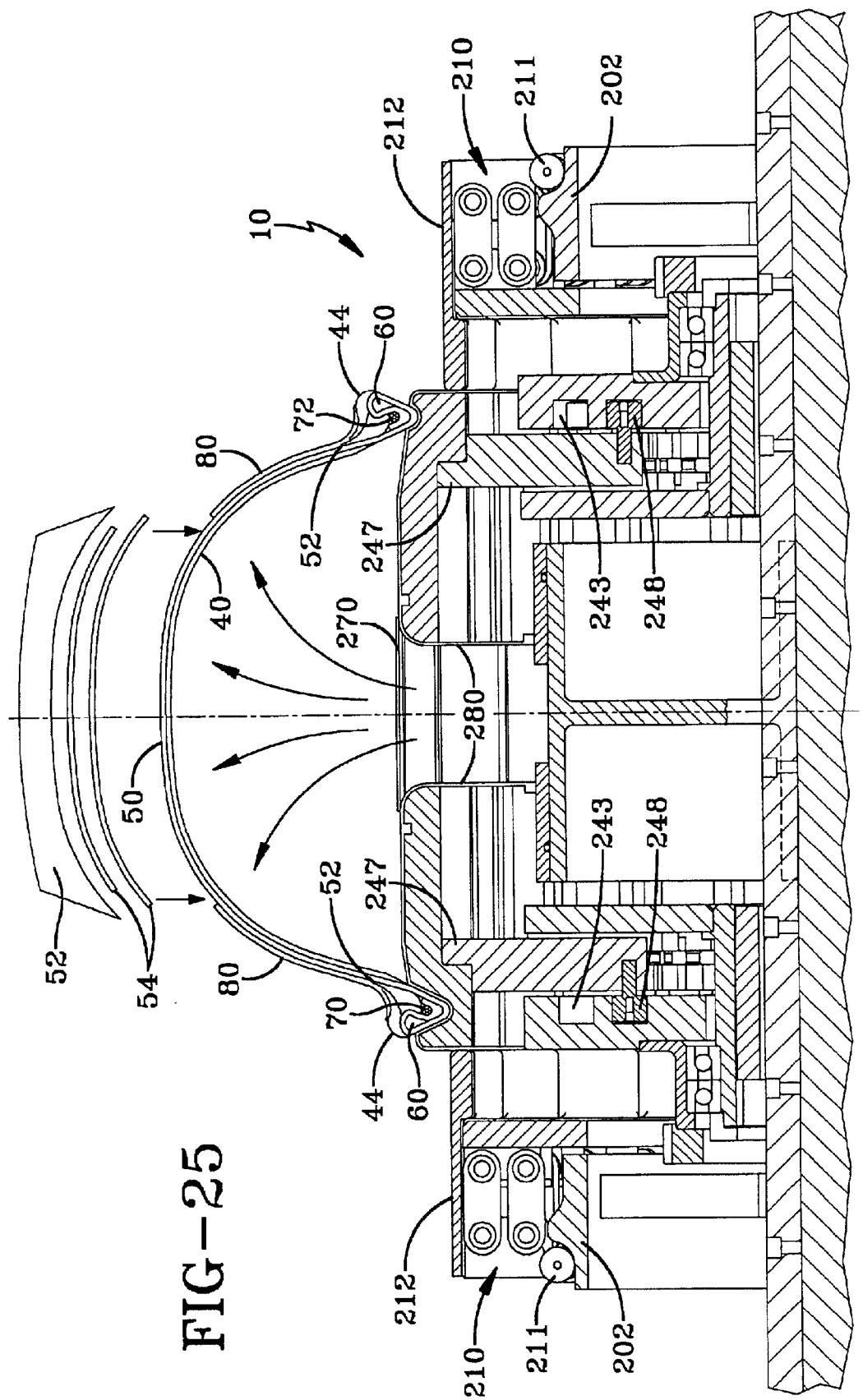
Figure 26:
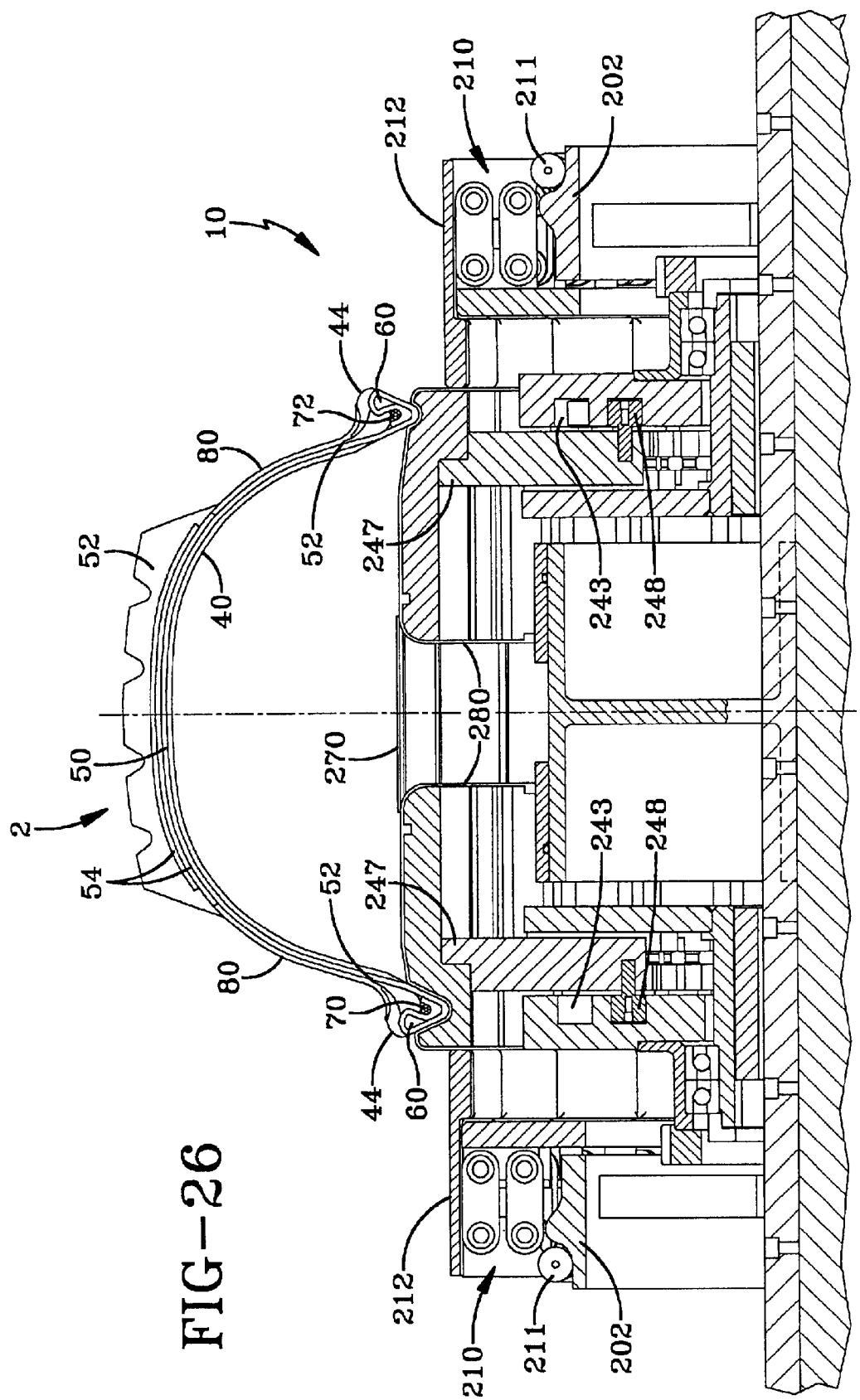

With reference to FIG. 25, a previously manufactured belt 54 and tread 52 shown in dash lines can be placed over the axial and radial center of the drum 10. This can be accomplished via a tread and belt support ring on the tire building machine 112 not shown. The tire building drum 10 is then decreased in bead width setting by operating a common roller screw 160 which controls the axial position of the left and right diameter control assemblies 240, as well as the turn-up mechanisms 200. As the left and right diameter control assemblies 240 are moved axially inwardly, they slide underneath the outside edges of the multiple center deck segments 270. During this operation, air is injected into the chamber formed by the internal air seal 280 in the drum 10, the inside of the inner liner 40 of the tire 2, and the flexible sleeves 280 on the left and right diameter control assemblies 240. It is noted that the innerface of the bead sections of the tire carcass and the flexible sleeves 280, at this point in the tire building assembly have been driven down into the bottom of the bead pockets 274,275 forming airtight seals. The combined axially inward motion of the beads 70,72 with the inflation air will cause the center of the tire 2 to expand diametrically to meet the inside diameter of the tread belt 54 and tread 52. Alternatively, once the tire 2 is fully inflated, the tread 52 and belts 54 can be applied using a server and rotating the entire drum assembly. The tread and belt assembly is then stitched as required. The tire 2, once assembled, is easily removed from the drum 10 by decreasing the diameter of both diameter control assemblies 240. The mounted and assembled tire 2 is shown in FIG. 26.

Figure 27B:
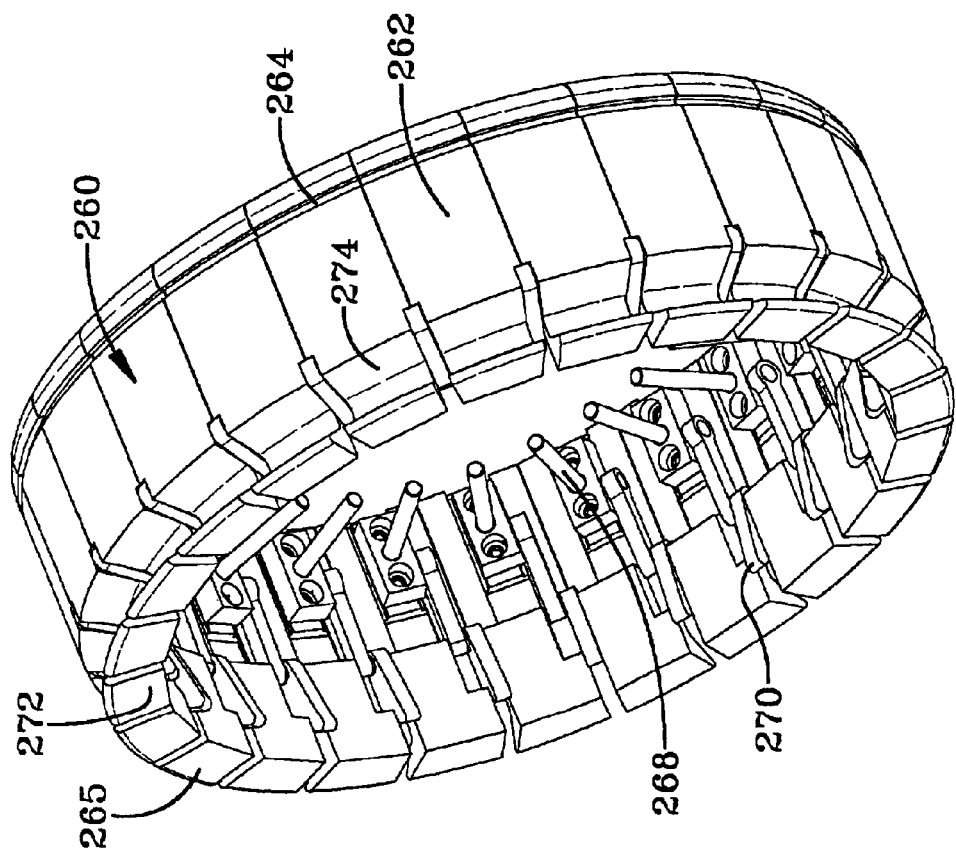
FIG. 27A and FIG. 27B are perspective views of the radially outer portions of the inboard and outboard assembly illustrating the tire receiving surface with supporting members in the radially outward position in the bead receiving groove area and in 27B the supporting members are shown detracted so that the bead can be assembled.
Figure 27A:
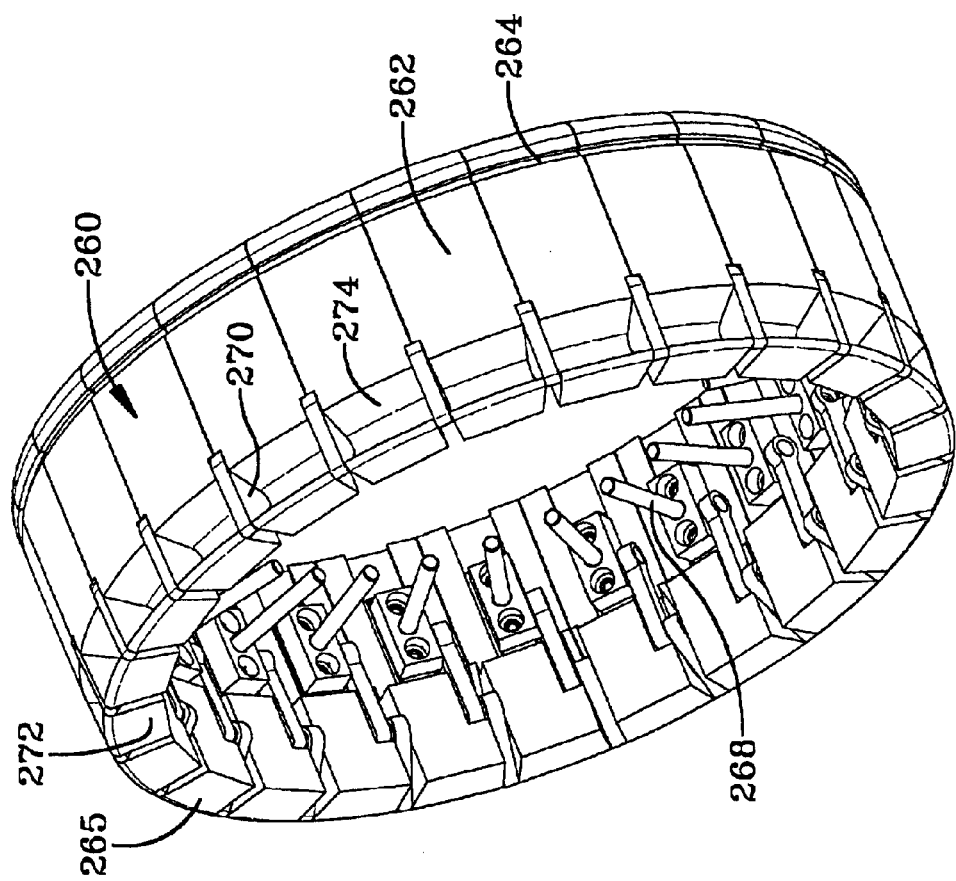
Figure 28A:
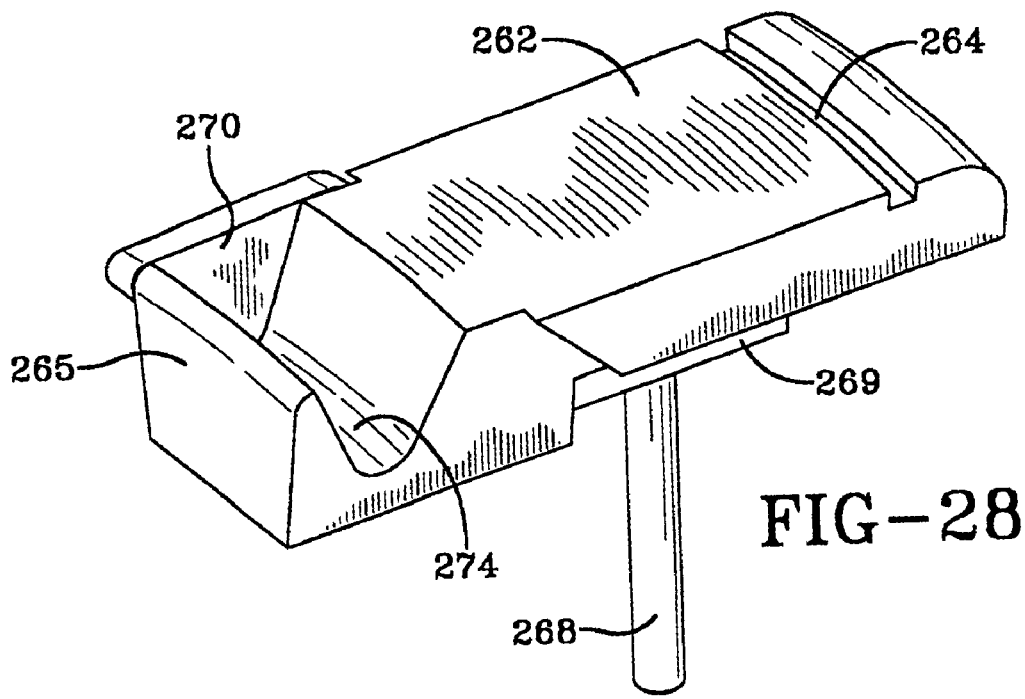
FIG. 28A and FIG. 28B illustrates enlarged perspective views of the mechanism shown in FIG. 27A and FIG. 27B.
Figure 28B:
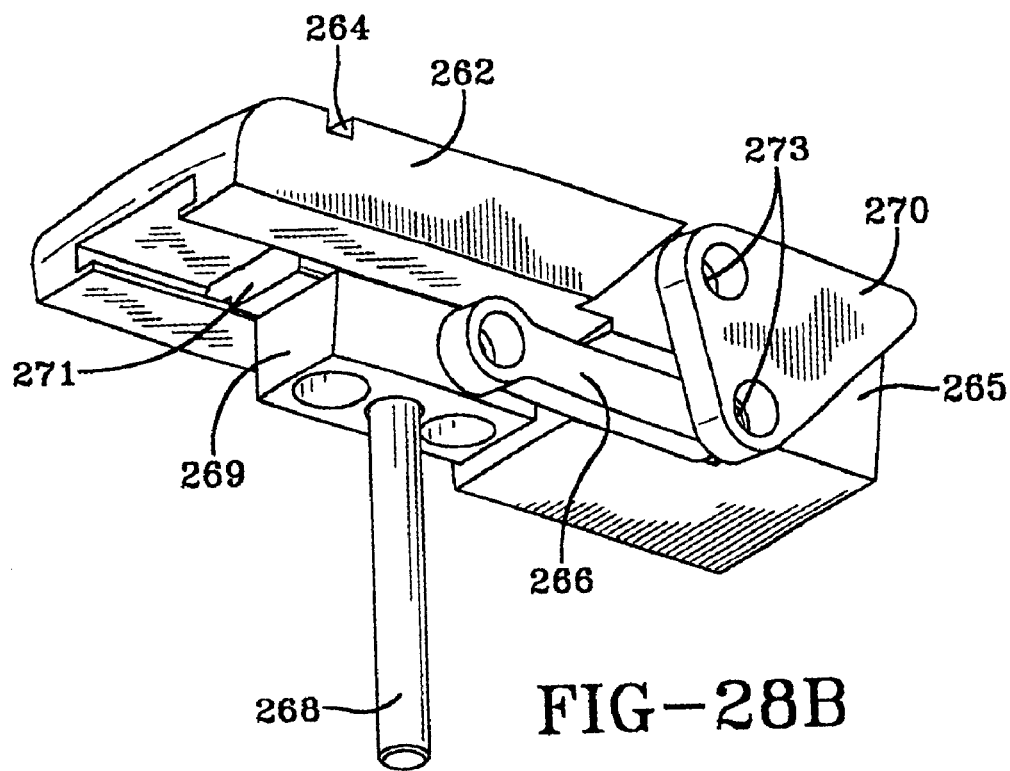

For a further detailed explanation of the diameter control assemblies 240 ability to move the radially expandable segment assembly 260, attention is drawn to FIGS. 27A through 29B. With reference to FIGS. 27A and 27B, the segment assembly 260 is illustrated. The segment assembly 260 has a plurality of segments 262. As shown, each segment 262 has a anchoring groove 264 cut on one side. When the segments 262 are aligned, the bead pocket 274, 275 forms an annular groove for accepting the beads 70 or 72. With reference to FIG. 27A a support arm 270 is shown adjacent each segment 262 and interposed therebetween. The arm 270 in the fully upright position provides additional support for the tire 2 as it is being assembled. On the opposite side of the pocket 274 is an end face 265.

With reference to FIG. 27B, the arms 270 are shown in the retracted position exposing the full bead pocket 274,275 for receiving the bead 70,72. Each segment 262 has a slide link 269 that is attached to a linear bearing 271. The linear bearing 271 is captured in the segment 262 as shown. This slide link 269 and linear bearing 271 provide movement enabling the arm 270 to retract. This is accomplished by the mid link 266, which is attached to the arm 270. The arm 270 is attached to the mid link via pin 273 and is further attached by a pin 273 to the segment 262 as shown. The slide pin 268, as shown, acts as guides to insure that the segments 262, when radially expanded, maintain a radial direction as the drum 10 approaches a fully expanded position.

Figure 29A:
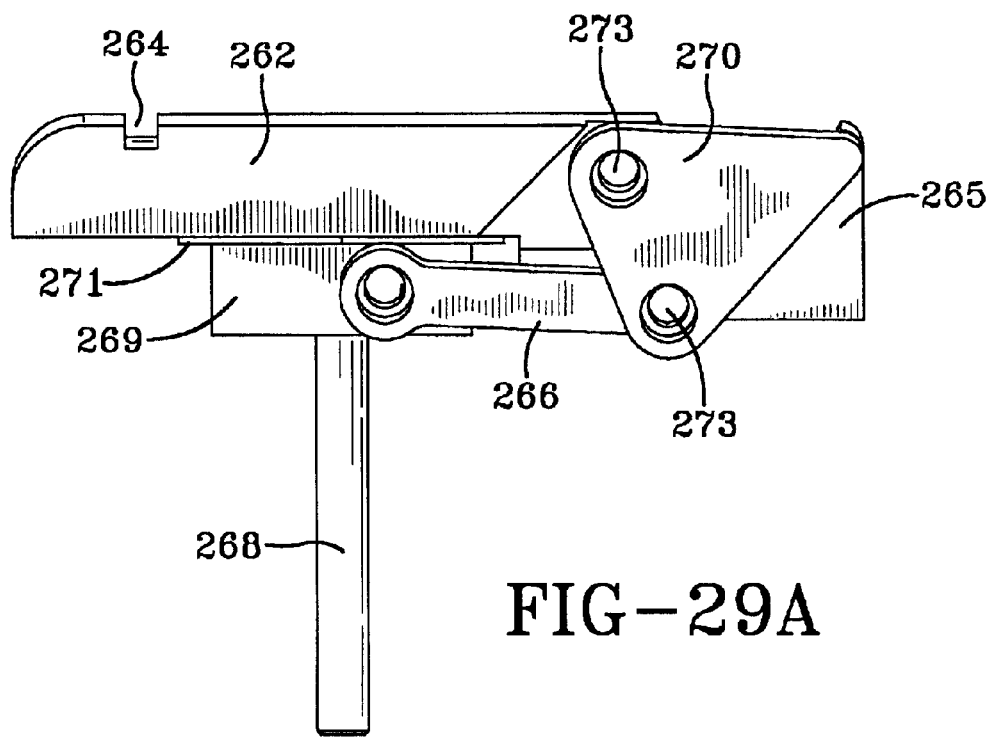
FIG. 29A and FIG. 29B show plan view of the mechanism in the up position and the retracted position, respectively.
Figure 29B:
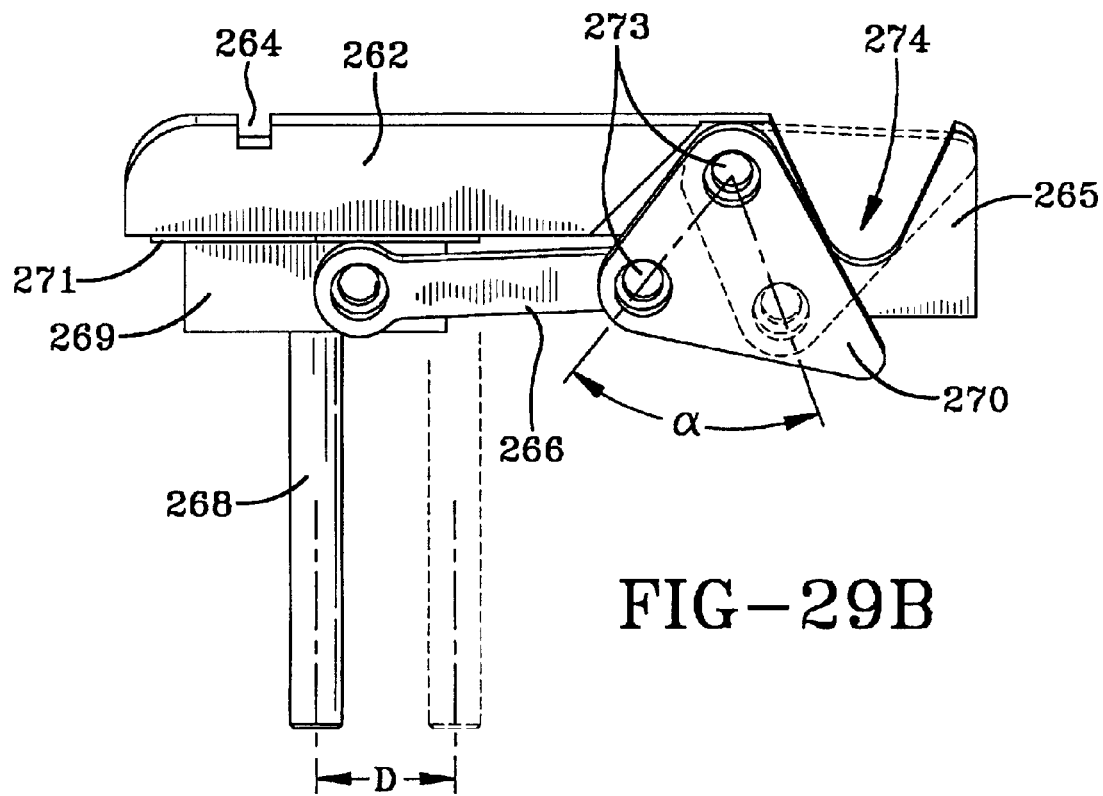

With reference to FIGS. 29A and 29B, the arm 270 is shown in the upright position for tire assembly, and is shown in the retracted position for bead mounting. As illustrated, the slide mechanism 269 moving along the linear bearing 271 retracts moving the slide pin 268 approximately a distance D as illustrated. As the slide pin 268 moves back, the mid-link arm 266 pulls the arm 270 into the retracted position swinging the arm 270 in an angular motion approximately an angle alpha as illustrated. This fully exposes the bead pocket 274. This embodiment, as shown, provides for support of the tire components as they are being mounted and prior to attaching the bead 70,72. Once the bead 70,72 is attached, it locks and secures the assembled tire components into position.

Alternatively, the sealing member 280 can be simply attached over the segments 262 and no arm mechanism may be required. In such a condition, the membrane 280 simply spans the pocket forming groove 274 and enables the tire 2 to be built. While this does not provide much support on applying the components, it is believed that addition of the bead will provide adequate stitching at that point in time where the drum 10 is fully expanded causing the bead to press the assembled tire components tightly together.

As illustrated, the radially expandable assembly drum 10 permits the tire 2 to be built all the way through first and second stage tire building wherein the tread 52 and belt reinforcing structure 54 can be applied to this assembly drum 10 enabling the tire 2 to be completely finished and ready for vulcanization in a tire curing mold.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved radially expansible assembly drum for the manufacture of tires, comprising: a body mounted on a drum core assembly and presenting a radially movable receiving surface for tire components to be assembled, the ends of the receiving surface having the same or different diameters, a cam disk having a single cam follower groove, the cam follower groove providing a continuous range of selectable diameters of said receiving surface as a function of cam disk rotation, wherein said ends of the receiving surface are axially movable, wherein the drum core assembly includes a spindle for rotating the assembly drum, and a first external shaft being parallel and eccentrically located relative to the centerline of the spindle, wherein the first external shaft is connected to a first clutch mechanism, the engagement of the first clutch mechanism rotates the first external shaft to initiate radial expansion or contraction of the drum assembly, wherein the drum core assembly further includes a second external shaft connected to a means for axially moving the ends of the assembly drum, the second external shaft being parallel to and eccentrically located relative to the centerline of the spindle.

2. The improved radially expansible assembly drum for the manufacture of tires of claim 1, wherein the diameter of the receiving surface is radially variable at a rate of 40 mm per 360° of rotation of the assembly drum.

3. The improved radially expansible assembly drum for the manufacture of tires of claim 1 wherein the second external shaft is connected to a second clutch mechanism, the engagement of the second clutch mechanism rotates the second external shaft to initiate axial movement of the ends of the assembly drum.

4. The improved radially expansible assembly drum for the manufacture of tires of claim 3 wherein the second external shaft has oppositely directed threads at the end of the drum assembly relative to the opposite end of the drum assembly, the rotation of the second external shaft in one rotating direction moves the ends of the assembly drum closer and an opposite rotating direction moves the ends further apart.

5. The improved radially expansible assembly drum for the manufacture of tires of claim 1, the radially expansible assembly drum characterized by:

a three-way encoder means, the encoder means includes three sensors for indicating the angular rotation of the drum core assembly, one sensor indicating the angular location of the spindle, the first external shaft and the second external shaft, respectively.

6. The improved radially expansible assembly drum for the manufacture of tires of claim 5, further comprising a means for determining the angular position of each of the external shafts relative to a preselected building sequence to initiate the movements of the drum assembly.

7. The improved radially expansible assembly drum for the manufacture of tires of claim 1, further comprising a flexible elastic membrane for covering the ends of the receiving surface forming an airtight seal on each end of the assembly drum.

8. The improved radially expansible assembly drum for the manufacture of tires of claim 7 being further characterized by a means for inflating the assembled tire while on the assembly drum for a second stage assembly of a tread and belt components.

* * * * *